(12) United States Patent
Di et al.

(10) Patent No.: US 12,504,664 B2
(45) Date of Patent: Dec. 23, 2025

(54) ARRAY SUBSTRATE, MANUFACTURING METHOD THEREOF, LIQUID CRYSTAL CELL AND DISPLAY APPARATUS

(71) Applicant: BOE Technology Group Co., Ltd., Beijing (CN)

(72) Inventors: Yunping Di, Beijing (CN); Chenyang Zhang, Beijing (CN); Lizhong Wang, Beijing (CN); Yichi Zhang, Beijing (CN); Haoliang Zheng, Beijing (CN); Zhen Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 16 days.

(21) Appl. No.: 18/578,363

(22) PCT Filed: Jul. 26, 2022

(86) PCT No.: PCT/CN2022/107816
§ 371 (c)(1),
(2) Date: Jan. 11, 2024

(87) PCT Pub. No.: WO2024/020767
PCT Pub. Date: Feb. 1, 2024

(65) Prior Publication Data
US 2025/0093722 A1    Mar. 20, 2025

(51) Int. Cl.
*G02F 1/1362* (2006.01)
*H10D 86/60* (2025.01)

(52) U.S. Cl.
CPC .. *G02F 1/136227* (2013.01); *G02F 1/136286* (2013.01); *H10D 86/60* (2025.01)

(58) Field of Classification Search
CPC ........ G02F 1/136227; G02F 1/136286; H10D 86/60
See application file for complete search history.

(56) References Cited

U.S. PATENT DOCUMENTS

| 5,877,832 A | 3/1999 | Shimada |
| 2004/0046912 A1 | 3/2004 | Ishino |

(Continued)

FOREIGN PATENT DOCUMENTS

| CN | 101661176 A | 3/2010 |
| CN | 101324721 B | 12/2010 |

(Continued)

*Primary Examiner* — Mariceli Santiago
(74) *Attorney, Agent, or Firm* — HOUTTEMAN LAW LLC

(57) ABSTRACT

An array substrate, a method for manufacturing an array substrate, a liquid crystal cell and a display apparatus are provided. The array substrate includes: a first base substrate; thin film transistors; a first planarization layer; a common electrode on a side of the first planarization layer away from the thin film transistors; a first dielectric layer on a side of the common electrode away from the first planarization layer; first pixel electrodes on a side of the first dielectric layer away from the common electrode; the first pixel electrodes are electrically connected to the thin film transistors in a one-to-one correspondence through first vias extending through the first dielectric layer and the first planarization layer; a surface of each first pixel electrode away from the first base substrate is provided with a first groove at least corresponding to a corresponding first via.

18 Claims, 25 Drawing Sheets

(56) References Cited

U.S. PATENT DOCUMENTS

| | | | | |
|---|---|---|---|---|
| 2009/0027579 A1* | 1/2009 | Aota | ................. | G02F 1/134363 |
| | | | | 349/41 |
| 2016/0259191 A1* | 9/2016 | Sun | .................... | H10D 30/6746 |
| 2019/0056620 A1 | 2/2019 | Akiyoshi | | |
| 2019/0258099 A1* | 8/2019 | Ozeki | ............... | G02F 1/136213 |
| 2021/0356824 A1* | 11/2021 | Li | ....................... | H10D 86/021 |
| 2024/0176195 A1* | 5/2024 | Morimoto | ......... | G02F 1/133711 |

FOREIGN PATENT DOCUMENTS

| | | | |
|---|---|---|---|
| CN | 102750024 | A | 10/2012 |
| CN | 104157612 | A | 11/2014 |
| CN | 104238163 | A | 12/2014 |
| CN | 104820324 | A | 8/2015 |
| CN | 106684101 | A | 5/2017 |
| CN | 109870855 | A | 6/2019 |
| CN | 110941123 | A | 3/2020 |
| CN | 111427207 | A | 7/2020 |
| CN | 112782895 | A | 5/2021 |
| CN | 112782896 | A | 5/2021 |
| CN | 113064304 | A | 7/2021 |
| CN | 114068590 | A | 2/2022 |
| JP | 2003149681 | A | 5/2003 |
| JP | 2012247663 | A | 12/2012 |
| JP | 2013186360 | A | 9/2013 |
| JP | 2013195807 | A * | 9/2013 |
| KR | 20130053592 | A | 5/2013 |
| KR | 20150074379 | A | 7/2015 |

* cited by examiner

29

ARRAY SUBSTRATE, MANUFACTURING METHOD THEREOF, LIQUID CRYSTAL CELL AND DISPLAY APPARATUS

TECHNICAL FIELD

The present disclosure relates to the field of display technology, and in particular to an array substrate, a method for manufacturing an array substrate, a liquid crystal cell and a display apparatus.

BACKGROUND

An operating principle of a liquid crystal spatial light modulator is based on an optical phased array technology. Specifically, refractive indexes of a liquid crystal layer is controlled by an external electric field, so that portions of the liquid crystal layer at different positions have different refractive indexes, a certain phase difference may be formed between the portions of the liquid crystal layer; the phase distribution of the liquid crystal layer as a whole may be periodic and similar to a topography of a grating structure by properly adjusting the electric field. That is, equivalently, a phase depth topography similar to the grating structure is formed by using liquid crystals. When the light is incident to a phase surface of a grating structure of the liquid crystal layer, the light may deflect, the liquid crystal layer can realize different phase depth topographies through modulation of different electric fields, and the light can deflect at different angles.

For a small-size liquid crystal spatial light modulator, no spacer is usually added therein when encapsulating the liquid crystals, and a supporting effect for a cell gap is realized only through a peripheral frame sealing glue and liquid crystal molecules in a cell. However, the uniformity of the cell gap is poor, which causes a poor quality of regulating and controlling a light field of the liquid crystal spatial light modulator, and easily causes other defects, such as an uneven image quality, an insufficient modulating linearity and the like.

SUMMARY

The embodiments of the present disclosure provides an array substrate, wherein the array substrate includes: a first base substrate; a plurality of thin film transistors on one side of the first base substrate; a first planarization layer on a side of the plurality of thin film transistors away from the first base substrate; a common electrode on a side of the first planarization layer away from the plurality of thin film transistors; a first dielectric layer on a side of the common electrode away from the first planarization layer; a plurality of first pixel electrodes on a side of the first dielectric layer away from the common electrode; wherein the plurality of first pixel electrodes are electrically connected to the plurality of thin film transistors in a one-to-one correspondence manner through first vias extending through the first dielectric layer and the first planarization layer; a surface of each first pixel electrode away from the first base substrate is provided with a first groove at least corresponding to a first via; and a plurality of flat portions on a side of the first groove away from the first base substrate; wherein a distance from a surface of each flat portion away from the first base substrate to the first base substrate is substantially the same as a distance from the surface of each first pixel electrode away from the first base substrate to the first base substrate.

In some embodiments, the array substrate further includes: a plurality of second pixel electrodes on a side of the plurality of first pixel electrodes away from the first base substrate, and in contact with the plurality of first pixel electrodes.

In some embodiments, an orthographic projection of each second pixel electrode on the first base substrate covers an orthographic projection of the corresponding first pixel electrode on the first base substrate.

In some embodiments, each second pixel electrode includes a first opening, and an orthographic projection of each first opening on the first base substrate covers an orthographic projection of the corresponding flat portion on the first base substrate.

In some embodiments, an orthographic projection of each first opening on the first base substrate substantially overlaps with an orthographic projection of the corresponding flat portion on the first base substrate.

In some embodiments, the orthographic projection of each second pixel electrode on the first base substrate surrounds the orthographic projection of the corresponding flat portion on the first base substrate, and the orthographic projection of each second pixel electrode on the first base substrate and the orthographic projection of the corresponding flat portion on the first base substrate are combined together to form a closed pattern.

In some embodiments, the common electrode is made of a transparent material; and the plurality of first pixel electrodes are made of a transparent material and the plurality of second pixel electrodes are made of a reflective material; or the plurality of first pixel electrodes are made of a reflective material and the plurality of second pixel electrodes are made of a reflective material.

In some embodiments, the array substrate further includes: a first protective layer on a side of the plurality of second pixel electrodes away from the first base substrate; and a plurality of floating reflective patterns on a side of the first protective layer away from the plurality of second pixel electrodes; and an orthographic projection of each floating reflective pattern on the first base substrate covers a gap between orthographic projections of two second pixel electrodes adjacent to the floating reflective pattern on the first base substrate.

In some embodiments, the common electrode, the first pixel electrodes, and the second pixel electrodes are made of a transparent material.

In some embodiments, the common electrode is made of a reflective material and the first pixel electrodes are made of a transparent material.

In some embodiments, each first via includes: a first sub-via extending through the first planarization layer and a second sub-via extending through the first dielectric layer; and the first dielectric layer covers a part of the first sub-via, an orthographic projection of the second sub-via on the first base substrate is within an orthographic projection of the first sub-via on the first base substrate, and the second sub-via is within the first sub-via.

In some embodiments, each first via includes: a first sub-via extending through the first planarization layer and a second sub-via extending through the first dielectric layer; and an orthographic projection of the first sub-via on the first base substrate is within an orthographic projection of the corresponding second sub-via on the first base substrate.

In some embodiments, in a direction from each first pixel electrode to the first base substrate, a cross-sectional area of the first sub-via in a direction parallel to a plane where the first base substrate is located gradually decreases, a cross-sectional area of the second sub-via in the direction parallel to the plane where the first base substrate is located gradually decreases, and a maximum cross-sectional area of the first sub-via in the direction parallel to the plane where the first base substrate is located is equal to a minimum cross-sectional area of the second sub-via in the direction parallel to the plane where the first base substrate is located.

In some embodiments, in a direction from each first pixel electrode to the first base substrate, a cross-sectional area of the first sub-via in a direction parallel to a plane where the first base substrate is located gradually decreases, a cross-sectional area of the second sub-via in the direction parallel to the plane where the first base substrate is located gradually decreases, and a maximum cross-sectional area of the second sub-via in the direction parallel to the plane where the first base substrate is located is greater than a minimum cross-sectional area of the first sub-via in the direction parallel to the plane where the first base substrate is located.

In some embodiments, the array substrate further includes: a plurality of first connection electrodes in the same layer as the common electrode and each covering the corresponding first sub-via; wherein each first connection electrode is in contact with the corresponding first pixel electrode and the corresponding thin film transistor.

In some embodiments, each thin film transistor includes: an active layer, a gate electrode, a source electrode and a drain electrode; the drain electrode is electrically connected to the corresponding first pixel electrode; the source electrode is located between the drain electrode and the first base substrate.

In some embodiments, the array substrate includes a plurality of scanning lines and a plurality of data lines crossing each other in horizontal and vertical directions; the plurality of scanning lines and the plurality of data lines divide a plurality of sub-pixel units; each sub-pixel unit includes the thin film transistor and the first pixel electrode electrically connected to the thin film transistor; the plurality of scanning lines extend along a first direction and are arranged along a second direction, and the plurality of data lines extend along the second direction and are arranged along the first direction; the first direction intersects the second direction; the plurality of sub-pixel units are divided into: a plurality of sub-pixel unit rows extending along the first direction and arranged along the second direction, and a plurality of sub-pixel unit columns extending along the second direction and arranged along the first direction, wherein each sub-pixel unit row includes a scanning line electrically connected to the thin film transistors in the sub-pixel unit row, and each sub-pixel unit column includes a data line electrically connected to the thin film transistors in the sub-pixel unit column; each scanning line is between the corresponding drain electrode and the active layer in a direction perpendicular to the first base substrate; the gate electrode is in an area where an orthographic projection of the scanning line on the first base substrate overlaps with the orthographic projection of the active layer on the first base substrate; and the plurality of data lines are on a side of the plurality of scanning lines away from the active layer, and the source electrode is in an area of the data line where the data line is electrically connected to the active layer.

In some embodiments, an orthographic projection of each first pixel electrode on the first base substrate overlaps with an orthographic projection of the scanning line, in a sub-pixel unit row adjacent to the sub-pixel unit row where the first pixel electrode is located, on the first base substrate.

In some embodiments, the orthographic projection of each first pixel electrode on the first base substrate overlaps with an orthographic projection of the data line in the same sub-pixel unit column as the first pixel electrode on the first base substrate.

In some embodiments, a pattern of the orthographic projection of the active layer on the first base substrate includes: a first portion, a second portion and a third portion connected sequentially; and the first portion is electrically connected to the source electrode, the third portion is electrically connected to the drain electrode, and an orthographic projection of the scanning line on the first base substrate overlaps with an orthographic projection of the second portion on the first base substrate.

In some embodiments, the first portion and the third portion each include a portion extending along the second direction, the second portion extends along the first direction; both ends of the second portion in the first direction are connected to the first portion and the third portion, respectively, and the first portion and the third portion are on opposite sides of the second portion in the second direction, respectively; and an extending direction of the second portion is parallel to an extending direction of the scanning line; the orthographic projection of the second portion on the first base substrate falls within the orthographic projection of the scanning line on the first base substrate.

In some embodiments, in the second direction, a width of the second portion is less than a width of the scanning line.

In some embodiments, the second portion extends along the second direction; both ends of the second portion in the second direction are connected to the first portion and the third portion, respectively, and the first portion and the third portion are on opposite sides of the second portion in the first direction; and the extending direction of the second portion is perpendicular to the extending direction of the scanning line; the orthographic projection of the second portion on the first base substrate overlaps with the orthographic projection of the scanning line on the first base substrate, and an orthographic projection of the first portion on the first base substrate and an orthographic projection of the third portion on the first base substrate do not overlap with the orthographic projection of the scanning line on the first base substrate.

In some embodiments, a pattern of the orthographic projection of the active layer on the first base substrate includes: a first portion, a second portion and a third portion connected sequentially; the first portion and the third portion extend in the second direction, the second portion extends in the first direction; both ends of the second portion in the first direction are connected to the first portion and the third portion, and the first portion and the third portion are located on the same side of the second portion in the second direction; the first portion is electrically connected to the source electrode, and the third portion is electrically connected to the drain electrode; the orthographic projection of the scanning line on the first base substrate overlaps with an orthographic projection of each of the first portion and the third portion on the first base substrate, and does not overlap with an orthographic projection of the second portion on the first base substrate; and the gate electrode includes a first gate electrode and a second gate electrode; the first gate electrode is in a region of the scanning line where the orthographic projection of the scanning line on the first base substrate overlaps with the orthographic projection of the first portion on the first base substrate, and the second gate electrode is located in a region of the scanning line where the orthographic projection of the scanning line on the first base substrate overlaps with the orthographic projection of the third portion on the first base substrate.

In some embodiments, a pattern of the orthographic projection of the active layer on the first base substrate includes: a first portion and a second portion connected to each other; the first portion extends along the first direction, the second portion extends along the second direction; the first portion is electrically connected to the drain electrode, and the second portion is electrically connected to the source electrode; and the orthographic projection of the scanning line on the first base substrate overlaps with the orthographic projection of at least one of the first portion and the second portion on the first base substrate.

In some embodiments, the orthographic projection of the scanning line on the first base substrate has a strip shape extending along the first direction, and the orthographic projection of the scanning line on the first base substrate overlaps with only the orthographic projection of the first portion on the first base substrate.

In some embodiments, the orthographic projection of the scanning line on the first base substrate overlaps with the orthographic projection of each of the first portion and the second portion on the first base substrate; and the gate electrode includes a first gate electrode and a second gate electrode; the first gate electrode is in a region of the scanning line where the orthographic projection of the scanning line on the first base substrate overlaps with the orthographic projection of the second portion on the first base substrate, and the second gate electrode is in a region of the scanning line where the orthographic projection of the scanning line on the first base substrate overlaps with the orthographic projection of the first portion on the first base substrate.

In some embodiments, a pattern of the orthographic projection of the scanning line on the first base substrate includes a strip-shaped first pattern extending in the first direction, and a second pattern connected to the first pattern on a side of the first pattern in the second direction; and an orthographic projection of the first pattern on the first base substrate overlaps with the orthographic projection of the second portion on the first base substrate, and the orthographic projection of the second pattern on the first base substrate overlaps with the orthographic projection of the first portion on the first base substrate.

In some embodiments, the orthographic projection of each first pixel electrode on the first base substrate has a rectangular shape; and a minimum distance between an edge of the orthographic projection of the first via on the first base substrate close to an edge of the first pixel electrode and an edge of the orthographic projection of the first pixel electrode on the first base substrate in each of the first direction and the second direction is less than or equal to 1.5 micrometers.

In some embodiments, the orthographic projection of the first via on the first base substrate is close to one right angle of the rectangular shape.

In some embodiments, the array substrate has a pixel density of greater than 1000.

The embodiment of the present disclosure provides a method for manufacturing an array substrate, including: sequentially forming a plurality of thin film transistors, a first planarization layer, a pattern of a common electrode and a first dielectric layer on a first base substrate, and forming first vias extending through the first planarization layer and the first dielectric layer; forming first pixel electrodes on a side of the first dielectric layer away from the common electrode; wherein the first pixel electrodes are electrically connected to the plurality of thin film transistors in a one-to-one correspondence manner through the first vias extending through the first dielectric layer and the first planarization layer; a surface of each first pixel electrode away from the first base substrate is provided with a first groove at least corresponding to the first via; and forming flat portions on a side of the first groove away from the first base substrate; wherein a distance from a surface of each flat portion away from the first base substrate to the first base substrate is substantially the same as a distance from the surface of each first pixel electrode away from the first base substrate to the first base substrate.

The embodiment of the present disclosure provides a liquid crystal cell, including: the array substrate provided by the embodiment of the present disclosure; an opposite substrate opposite to the array substrate; and a liquid crystal layer between the array substrate and the opposite substrate.

The embodiment of the present disclosure provides a display apparatus, including the liquid crystal cell provided by the embodiment of the present disclosure.

BRIEF DESCRIPTION OF DRAWINGS

In order to more clearly illustrate the technical solutions in the embodiments of the present disclosure, drawings required in the description of the embodiments will be briefly described below. It is apparent that the drawings in the description below are only some embodiments of the present disclosure. It is obvious for one of ordinary skill in the art that other drawings may be obtained according to these drawings without creative efforts.

DETAIL DESCRIPTION OF EMBODIMENTS

Figure 1:
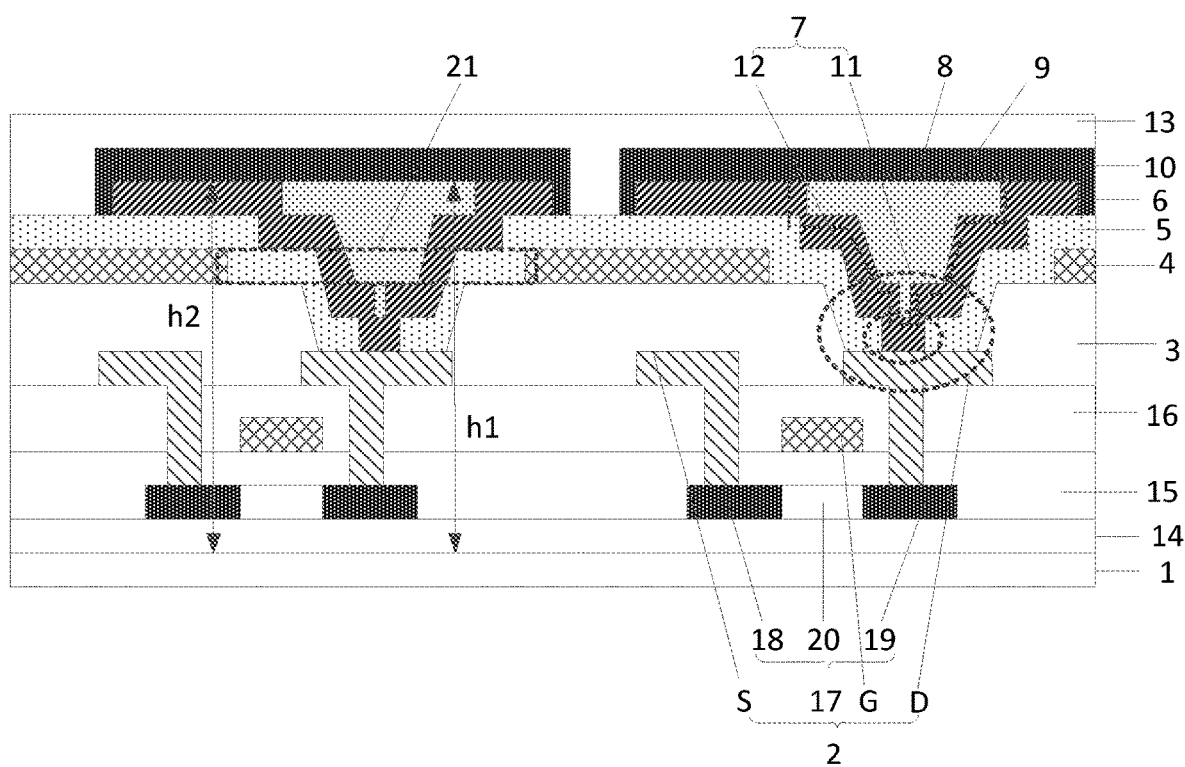
FIG. 1 is a schematic diagram of a structure of an array substrate according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a part of, not all, embodiments of the present disclosure. The embodiments and features of the embodiments in the present disclosure may be combined with each other without conflict. All other embodiments, which can be derived by a person skilled in the art from the described embodiments of the present disclosure without any creative effort, are within the protective scope of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. The term "comprising", "including", or the like means that the element or item preceding the term contains the element or item listed after the term and its equivalent, but does not exclude other elements or items. The term "connected", "coupled", or the like is not limited to physical or mechanical connections, but may include electrical connections, whether direct or indirect connections.

It should be noted that the shapes and sizes of various elements shown in the drawings are not necessarily drawn to scale and are merely schematic representations of the present disclosure. Like or similar reference numerals refer to like or similar elements or elements having like or similar functions throughout.

In the related art, a liquid crystal cell includes an array substrate; when the array substrate includes a pixel electrode and a common electrode which are necessarily insulated from each other, and the common electrode is located between the pixel electrode and a first base substrate, the pixel electrode at least needs to be electrically connected to a thin film transistor through a via extending through two insulating layers. Due to the existence of the via, a surface of a first pixel electrode away from the first base substrate is uneven, the uniformity of the cell gap is poor, and a quality of regulating and controlling a light field by using the liquid crystal cell is poor.

Aiming at the above problems in the related art, an embodiment of the present disclosure provides an array substrate, as shown in FIGS. 1 to 9, including:

A first base substrate 1;

A plurality of thin film transistors 2 located on one side of the first base substrate 1;

A first planarization layer 3 located on a side of the plurality of thin film transistors 2 away from the first base substrate 1;

A common electrode 4 located on a side of the first planarization layer 3 away from the plurality of thin film transistors 2;

A first dielectric layer 5 located on a side of the common electrode 4 away from the first planarization layer 3;

A plurality of first pixel electrodes 6 located on a side of the first dielectric layer 5 away from the common electrode 4; the plurality of first pixel electrodes 6 are electrically connected to the plurality of thin film transistors 2 in a one-to-one correspondence manner through first vias 7 extending through the first dielectric layer 5 and the first planarization layer 3; a surface of each first pixel electrode 6 away from the first base substrate 1 is provided with a first groove 8 at least corresponding to the first via 7;

A plurality of flat portions 9 located on a side of the first grooves 8 away from the first base substrate 1; a distance h1 from a surface of each flat portion 9 away from the first base substrate 1 to the first base substrate 1 is substantially the same as a distance h2 from the surface of each first pixel electrode 6 away from the first base substrate 1 to the first base substrate 1.

It should be noted that the distance h1 from the surface of each flat portion away from the first base substrate to the first base substrate is substantially the same as the distance h2 from the surface of each first pixel electrode away from the first base substrate to the first base substrate, which means that |h1-h2| is within a tolerance range. That is, when |h1-h2| is within the tolerance range, it can be considered that the distance h1 from the surface of each flat portion away from the first base substrate to the first base substrate is the same as the distance h2 from the surface of each first pixel electrode away from the first base substrate to the first base substrate. That is, each flat portion may fill and level the corresponding first groove. In a specific implementation, an error is, for example, 0.3 micrometers, that is, |h1-h2| is less than or equal to 0.3 micrometers. Under such a condition, it can be considered that the distance h1 from the surface of each flat portion away from the first base substrate to the first base substrate is the same as the distance h2 from the surface of each first pixel electrode away from the first base substrate to the first base substrate.

In the array substrate provided by the embodiment of the present disclosure, the distance from the surface of each flat portion away from the first base substrate to the first base substrate is substantially the same as the distance from the surface of each first pixel electrode away from the first base substrate to the first base substrate, that is, each flat portion may be used to fill and level the corresponding first groove of the first pixel electrode in an area where the first vias are located, which can improve the uniformity of the thickness of the array substrate. When the array substrate is applied to the liquid crystal cell, the uniformity of the liquid crystal cell gap can be improved, the quality of regulating and controlling a light field of the liquid crystal cell can be improved, and the phenomena of uneven image quality and the insufficient modulating linearity can be avoided.

In some embodiments, as shown in FIG. 1, the array substrate further includes:

A plurality of second pixel electrodes 10 located on a side of the first pixel electrodes 6 away from the first base substrate 1, and in contact with the first pixel electrodes 6.

That is, in the array substrate provided by the embodiment of the present disclosure, each second pixel electrode is disposed on the common substantially flat surface of the corresponding first pixel electrode and the flat portion. The second pixel electrode and the first pixel electrode corresponding to each other can be regarded as laminated pixel electrodes.

In a specific implementation, the array substrate provided by the embodiment of the present disclosure may be applied to a reflective liquid crystal display, and may also be applied to a transmissive liquid crystal display.

In a specific implementation, when the array substrate provided by the embodiment of the present disclosure is applied to the reflective liquid crystal display, each second pixel electrode is made of a reflective material. That is, each second pixel electrode as the pixel electrode may form an electric field with the common electrode to control the liquid crystal molecules to rotate, and the second pixel electrode may further function as a reflective electrode.

In some embodiments, the common electrode and the first pixel electrodes are made of a transparent material. That is, the common electrode and the first pixel electrodes are transparent electrodes.

Alternatively, in some embodiments, the common electrode is made of a transparent material and the first pixel electrodes are made of a reflective material. That is, the first pixel electrodes and the second pixel electrodes are both reflective electrodes.

In some embodiments, the first pixel electrodes and the second pixel electrodes may be made of the same material.

In some embodiments, the transparent material is, for example, indium tin oxide (ITO), and the reflective material may be a single layer of aluminum (Al), a single layer of Al alloy, a titanium (Ti)/Al/Ti stack, a Ti/Al/titanium nitride (TiN) stack, or the like.

In a specific implementation, when the array substrate provided by the embodiment of the present disclosure is applied to a transmissive liquid crystal display, the common electrode, the first pixel electrodes and the second pixel electrodes all are made of a transparent material. The common electrode, the first pixel electrodes and the second pixel electrodes may be made of the same material, for example, ITO.

In some embodiments, the second pixel electrodes are in one-to-one correspondence with the first pixel electrodes.

Figure 2:
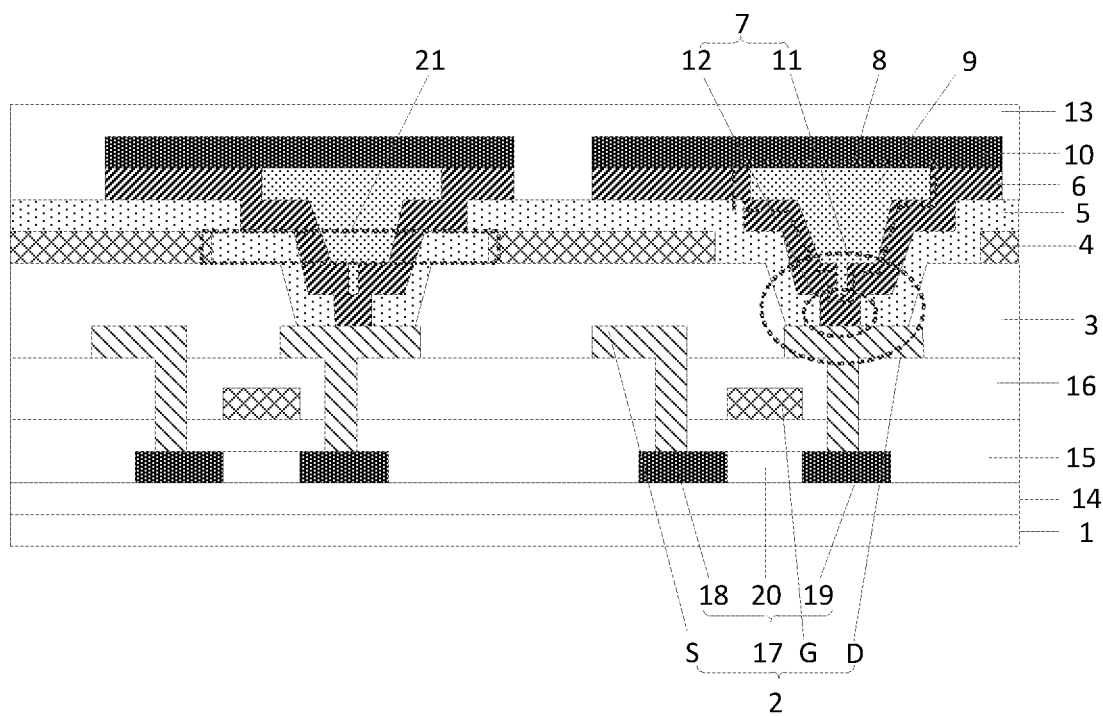
FIG. 2 is a schematic diagram of a structure of another array substrate according to an embodiment of the present disclosure.

In some embodiments, as shown in FIGS. 1 and 2, an orthographic projection of each second pixel electrode 10 on the first base substrate 1 covers an orthographic projection of the corresponding first pixel electrode 6 on the first base substrate 1.

It should be noted that the array substrate includes a plurality of pixel units, each pixel unit includes a plurality of sub-pixel units, and each sub-pixel unit includes a thin film transistor and a first pixel electrode. In the related art, when the array substrate is applied to a liquid crystal cell, an electric field generated between the first pixel electrode and the common electrode controls the liquid crystal molecules to rotate, so as to control the sub-pixels to transmit light therethrough. However, the first pixel electrode needs to be electrically connected to the thin film transistor through the first via, a depth of the first via is generally greater than 1 micrometer, the surface of the first pixel electrode is uneven at the first via; a topography in the area in which the electric field generated between the first pixel electrode and the common electrode controls the liquid crystal molecules to rotate, is different from that in other area in which the electric field generated between the first pixel electrode with a flat surface and the common electrode controls the liquid crystal molecules to rotate, so that the portion of the first pixel electrode at the first via cannot control the liquid crystal molecules to rotate to realize light transmission, and the area corresponding to the first via where the first pixel electrode is located cannot be utilized. That is, the area corresponding to the first via is a non-light-transmitting area. The uneven area of the first pixel electrode seriously influences an aperture ratio of the sub-pixel.

According to the array substrate provided by the embodiment of the present disclosure, the second pixel electrodes are further arranged on a side of the first pixel electrodes away from the first base substrate, and the orthographic projection of each second pixel electrode on the first base substrate covers the orthographic projection of the corresponding first pixel electrode on the first base substrate, that is, each second pixel electrode covers the corresponding first pixel electrode and the corresponding flat portion. Because the flat portion substantially fills and levels the corresponding first groove, the surface of the corresponding second pixel electrode away from the first base substrate is substantially a plane. When the array substrate is applied to a liquid crystal display product, no matter the reflective liquid crystal display or the transmissive liquid crystal display, the second pixel electrode in the area corresponding to the first groove may be used for controlling the liquid crystal molecules to rotate, so as to realize light transmission, and the aperture ratio of the sub-pixel can be improved.

In some embodiments, as shown in FIG. 1, the orthographic projection of each first pixel electrode 6 on the first base substrate 1 falls within the orthographic projection of the corresponding second pixel electrode 10 on the first base substrate 1.

In a specific implementation, as shown in FIG. 1, each second pixel electrode 10 covers an edge of the corresponding first pixel electrode 6.

In a specific implementation, a first pixel electrode material may be deposited to form a first pixel electrode layer, the first pixel electrode layer may be patterned (subjected to a patterning process) to form patterns of the first pixel electrodes, and then, patterns of the flat portions may be formed, and then a second pixel electrode material may be deposited to form a second pixel electrode layer, and the second pixel electrode layer may be patterned to form patterns of the second pixel electrodes.

Alternatively, in some embodiments, as shown in FIG. 2, the orthographic projection of each second pixel electrode 10 on the first base substrate 1 substantially overlaps with the orthographic projection of the corresponding first pixel electrode 6 on the first base substrate 1.

It should be noted that the orthographic projection of each second pixel electrode on the first base substrate substantially overlaps with the orthographic projection of the corresponding first pixel electrode on the first base substrate, which means that: a difference between an edge of the orthographic projection of each second pixel electrode on the first base substrate and an edge of the orthographic projection of the corresponding first pixel electrode on the first base substrate is within a tolerance range. That is, when the difference between the edge of the orthographic projection of each second pixel electrode on the first base substrate and the edge of the orthographic projection of the corresponding first pixel electrode on the first base substrate is within the tolerance range, it can be regarded that the orthographic projection of the second pixel electrode on the first base substrate overlaps with the orthographic projection of the corresponding first pixel electrode on the first base substrate.

In a specific implementation, for example, the first pixel electrode material may be deposited to form the first pixel electrode layer, the patterns of the flat portions are formed, and then, the second pixel electrode material is deposited to form the second pixel electrode layer, and the first pixel electrode layer and the second pixel electrode layer are patterned to form the patterns of the second pixel electrodes and the first pixel electrodes. That is, the patterning process is not required to be performed after the first pixel electrode layer is formed, and after the second pixel electrode layer is formed, the patterns of the second pixel electrodes and the patterns of the first pixel electrodes are formed through a single patterning process, wherein an orthographic projection of each second pixel electrode on the first base substrate substantially overlaps with an orthographic projection of the corresponding first pixel electrode on the first base substrate, so that one patterning process can be saved, and the cost can be saved.

Figure 3:
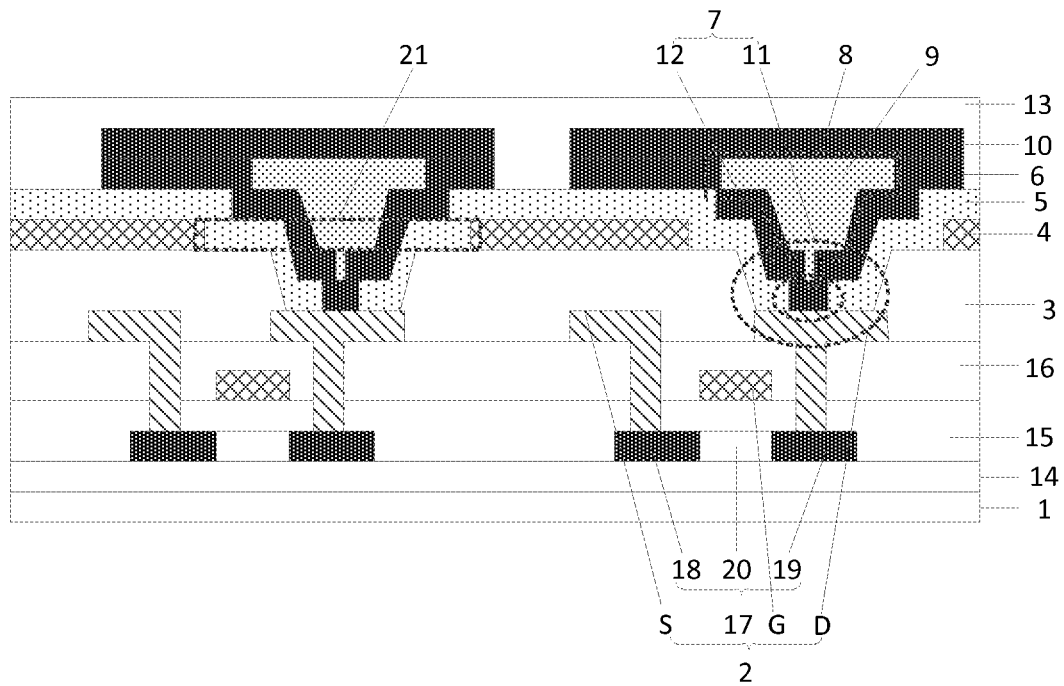
FIG. 3 is a schematic diagram of a structure of another array substrate according to an embodiment of the present disclosure.

In some embodiments, as shown in FIG. 3, the first pixel electrodes 6 and the second pixel electrodes 10 are made of the same material. When the array substrate is applied to the reflective liquid crystal display, the first pixel electrodes and the second pixel electrodes are made of the same reflective material; when the array substrate is applied to the transmissive liquid crystal display, the first pixel electrodes and the second pixel electrodes are made of the same transparent material. Therefore, the patterning process is not required to be performed after the first pixel electrode layer is formed, and after the second pixel electrode layer is formed, the patterns of the second pixel electrodes and the patterns of the first pixel electrodes are formed through a single patterning process, wherein an orthographic projection of each second pixel electrode on the first base substrate overlaps with an orthographic projection of the corresponding first pixel electrode on the first base substrate, so that such the process is simple and easy to implement.

In a specific implementation, when the array substrate is applied to the reflective liquid crystal display, the second pixel electrodes may also be disposed in a different manner from that in FIG. 1 to FIG. 3.

Figure 4:
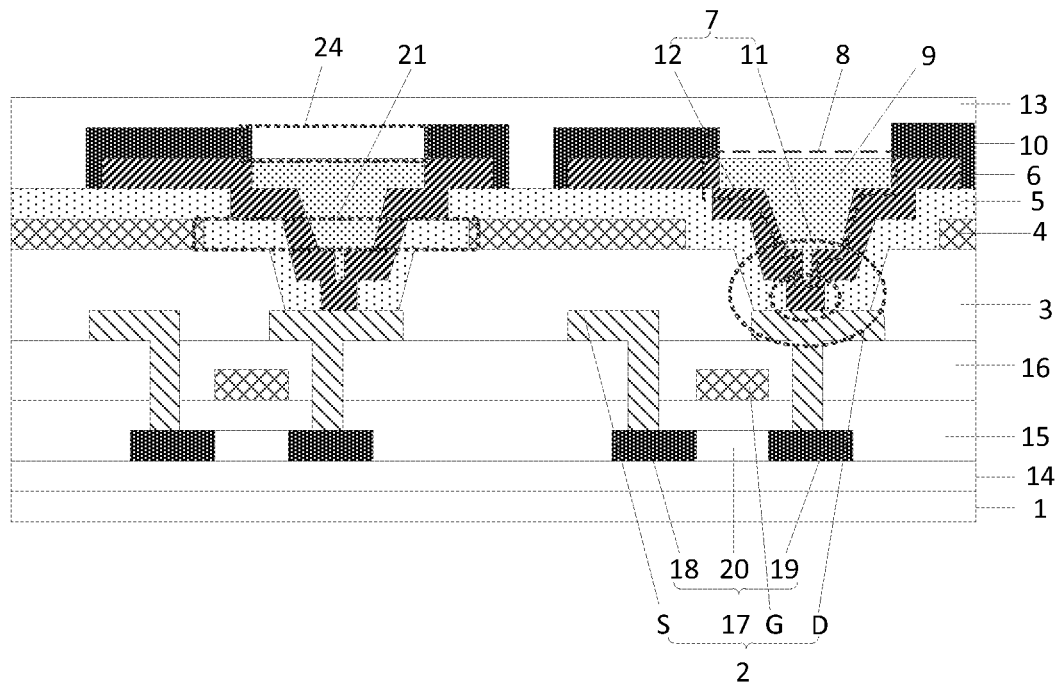
FIG. 4 is a schematic diagram of a structure of another array substrate according to an embodiment of the present disclosure.
Figure 5:
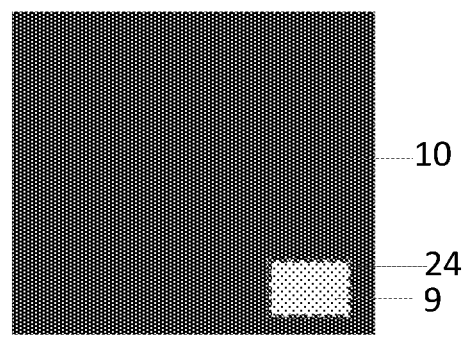
FIG. 5 is a top view of a second pixel electrode and a flat portion according to an embodiment of the present disclosure.

In some embodiments, as shown in FIGS. 4 and 5, each second pixel electrode includes a first opening 24, and an orthographic projection of each first opening 24 on the first base substrate 1 covers an orthographic projection of the corresponding flat portion 9 on the first base substrate.

In the array substrate provided by the embodiment of the present disclosure, each second pixel electrode exposes the corresponding flat portion. Therefore, it can avoid the stray reflected light caused by small unevenness of the reflective electrode due to the fact that the surface of the flat portion away from the first base substrate is provided with small concave portions or small convex portions, and the effect of the reflective liquid crystal display can be improved.

In some embodiments, as shown in FIG. 4, the orthographic projection of each first opening 24 on the first base substrate 1 substantially overlaps with the orthographic projection of the corresponding flat portion 9 on the first base substrate.

It should be noted that the orthographic projection of each first opening on the first base substrate substantially overlaps with the orthographic projection of the corresponding flat portion on the first base substrate, which means that a difference between an edge of the orthographic projection of the first opening on the first base substrate and an edge of the orthographic projection of the flat portion on the first base substrate is within a tolerance range. That is, when the difference between the edge of the orthographic projection of the first opening on the first base substrate and the edge of the orthographic projection of the flat portion on the first base substrate is within the tolerance range, it can be considered that the orthographic projection of each first opening on the first base substrate overlaps with the orthographic projection of the corresponding flat portion on the first base substrate.

In some embodiments, as shown in FIG. 4, the orthographic projection of each second pixel electrode 10 on the first base substrate 1 surrounds the orthographic projection of the corresponding flat portion 9 on the first base substrate 1, and the orthographic projection of each second pixel electrode 10 on the first base substrate 1 and the orthographic projection of the corresponding flat portion 9 on the first base substrate 1 are combined together to form a closed pattern. That is, no hollow-out area exists in an area corresponding to the orthographic projection of each second pixel electrode 10 on the first base substrate 1 and the orthographic projection of the corresponding flat portion 9 on the first base substrate 1. As shown in FIG. 5, the orthographic projection of each second pixel electrode 10 on the first base substrate 1 and the orthographic projection of the corresponding flat portion 9 on the first base substrate 1 are combined together to form a closed rectangular pattern.

In some embodiments, as shown in FIG. 4, the orthographic projections of each second pixel electrode 10 and the corresponding flat portion 9 on the first base substrate 1 cover an orthographic projection of the corresponding first pixel electrode 6 on the first base substrate 1.

In some embodiments, as shown in FIG. 4, the orthographic projection of each first pixel electrode 6 on the first base substrate 1 falls within the orthographic projections of the corresponding second pixel electrode 10 and the corresponding flat portion 9 on the first base substrate 1.

Figure 6:
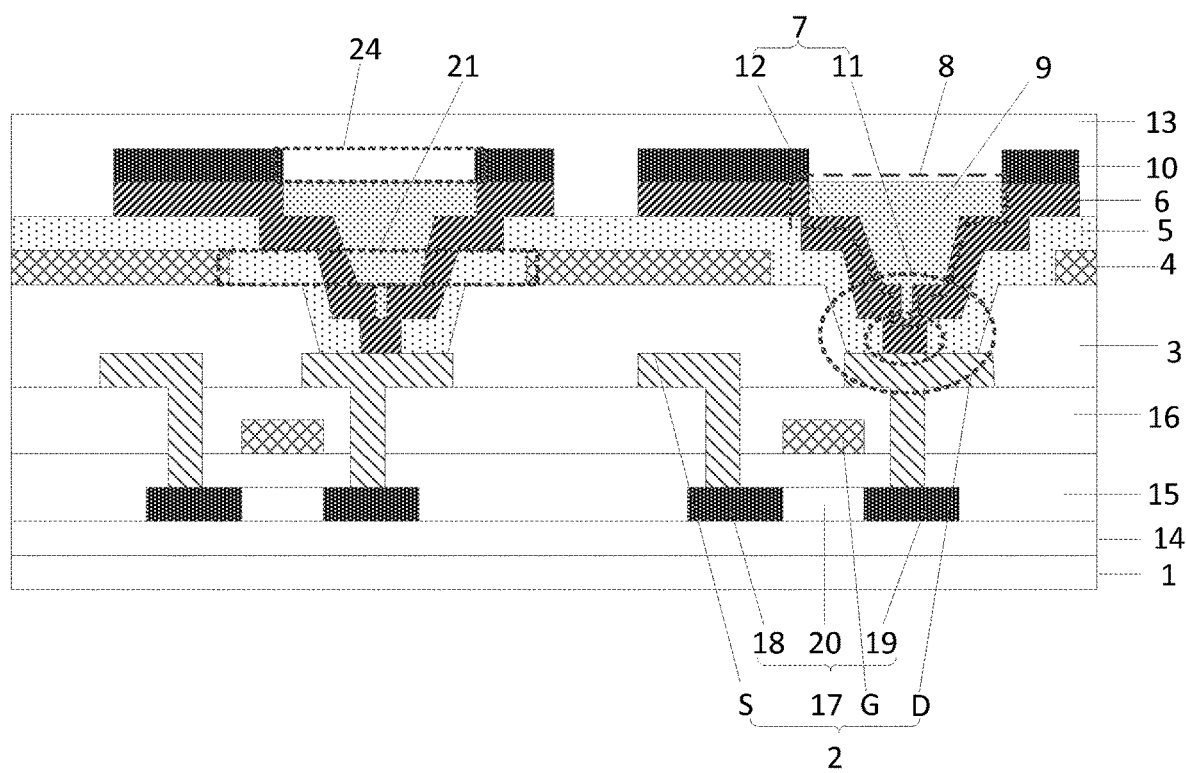
FIG. 6 is a schematic diagram of a structure of another array substrate according to an embodiment of the present disclosure.

Alternatively, as shown in FIG. 6, in some embodiments, the orthographic projections of each second pixel electrode 10 and the corresponding flat portion 9 on the first base substrate 1 substantially overlap with the orthographic projection of the corresponding first pixel electrode 6 on the first base substrate 1.

It should be noted that the orthographic projections of each second pixel electrode and the corresponding flat portion on the first base substrate substantially overlap with the orthographic projection of the corresponding first pixel electrode on the first base substrate, which means that: a difference between an edge of each of the orthographic projections of each second pixel electrode and the corresponding flat portion on the first base substrate and an edge of the orthographic projection of the corresponding first pixel electrode on the first base substrate is within a tolerance range. That is, when the difference between the edge of each of the orthographic projections of each second pixel electrode and the corresponding flat portion on the first base substrate and the edge of the orthographic projection of the corresponding first pixel electrode on the first base substrate is within the tolerance range, it can be considered that the orthographic projections of each second pixel electrode and the corresponding flat portion on the first base substrate overlap with the orthographic projection of the corresponding first pixel electrode on the first base substrate.

In a specific implementation, for example, the first pixel electrode material may be deposited to form the first pixel electrode layer, the patterns of the flat portions are formed, and then, the second pixel electrode material is deposited to form the second pixel electrode layer, and the first pixel electrode layer and the second pixel electrode layer are patterned to form the patterns of the second pixel electrodes and the first pixel electrodes. That is, the patterning process is not required to be performed after the first pixel electrode layer is formed, and after the second pixel electrode layer is formed, the patterns of the second pixel electrodes and the patterns of the first pixel electrodes are formed through a single patterning process, wherein an orthographic projection of each second pixel electrode on the first base substrate substantially overlaps with an orthographic projection of the corresponding first pixel electrode on the first base substrate, so that one patterning process can be saved, and the cost can be saved.

In some embodiments, as shown in FIGS. 1 to 4, 6 to 10, a thickness of the first planarization layer 3 is greater than that of the first dielectric layer 5 in a direction perpendicular to the first base substrate 1.

In some embodiments, as shown in FIGS. 1 to 4 and 6, each first via 7 includes: a first sub-via 11 extending through the first planarization layer 3 and a second sub-via 12 extending through the first dielectric layer 5.

In some embodiments, as shown in FIGS. 1 to 4 and 6, the first dielectric layer 5 covers a part of the first sub-via 11, an orthographic projection of the second sub-via 12 on the first base substrate 1 is located within an orthographic projection of the corresponding first sub-via 11 on the first base substrate 1, and the second sub-via 12 is located within the corresponding first sub-via 11.

In a specific implementation, for example, the first planarization layer is formed firstly, and the first sub-via is formed through a patterning process, then a pattern of the common electrode is formed, and then the first dielectric layer is formed, and the second sub-via is formed through a patterning process. That is, in the array substrate provided by the embodiment of the present disclosure, the first sub-via and the second sub-via are trepanned vias, and an area of the second sub-via is smaller than that of the first sub-via and the second sub-via is located in the first sub-via. In some embodiments, the first planarization layer is made of an organic material, and the first dielectric layer is made of an inorganic material. The organic material may be, for example, a photosensitive resin. The inorganic material may be silicon nitride (SiN), silicon oxide ($SiO_2$), or a $SiN/SiO_2$ stack.

In some embodiments, as shown in FIGS. 1 to 4 and 6, a cross-sectional shape of each first via 7 in the direction perpendicular to the first base substrate 1 is a polygon with more than four sides.

Alternatively, in some embodiments, as shown in FIGS. 7 to 10, the orthographic projection of the first sub-via 11 on the first base substrate 1 is located within the orthographic projection of the corresponding second sub-via 12 on the first base substrate 1.

Figure 7:
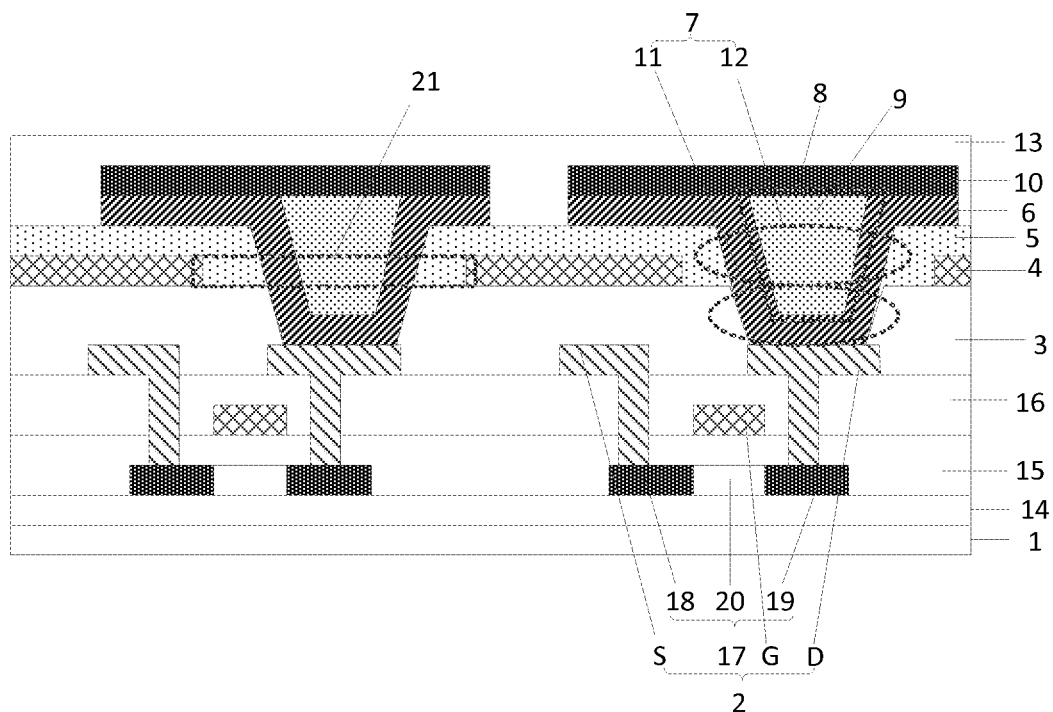
FIG. 7 is a schematic diagram of a structure of another array substrate according to an embodiment of the present disclosure.
Figure 8:
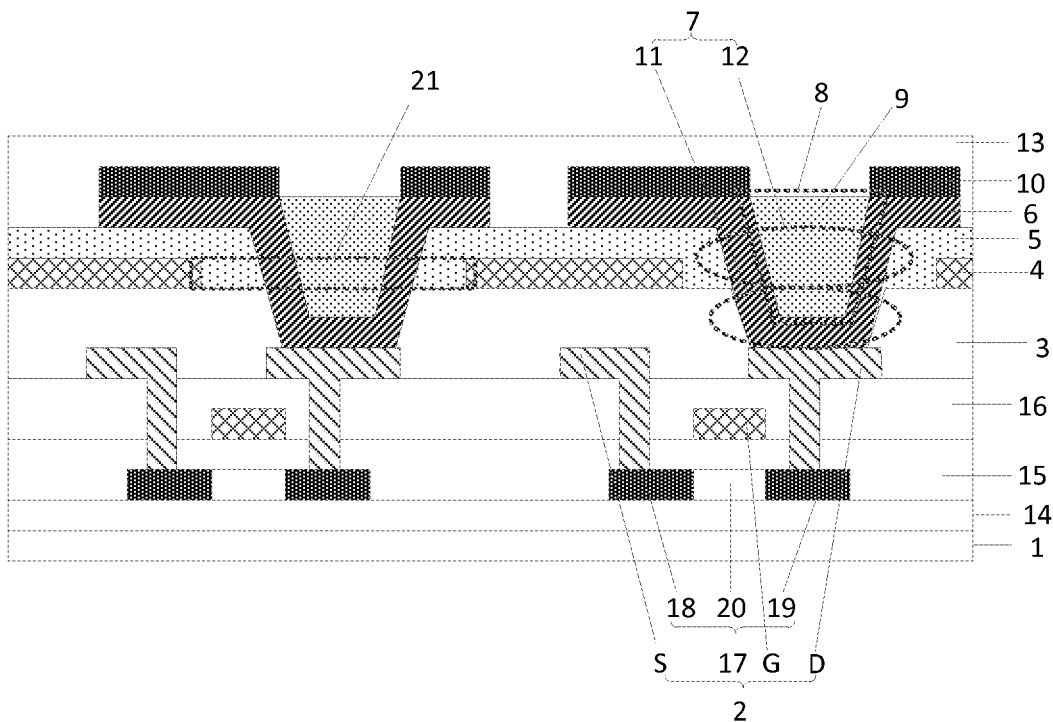
FIG. 8 is a schematic diagram of a structure of another array substrate according to an embodiment of the present disclosure.

In some embodiments, as shown in FIGS. 7 and 8, in a direction from the first pixel electrode 6 to the first base substrate 1, a cross-sectional area of the first sub-via 11 in a direction parallel to a plane where the first base substrate is located gradually decreases, a cross-sectional area of the second sub-via 12 in the direction parallel to the plane where the first base substrate is located gradually decreases, and a maximum cross-sectional area of the first sub-via 11 in the direction parallel to the plane where the first base substrate is located is equal to a minimum cross-sectional area of the second sub-via 12 in the direction parallel to the plane where the first base substrate is located.

In a specific implementation, for example, the first planarization layer is formed firstly, then the pattern of the common electrode is formed, then the first dielectric layer is formed, and the first dielectric layer and the first planarization layer are patterned to form the second sub-vias and the first sub-vias. The second sub-vias and the first sub-vias are formed through a single patterning process, so that the manufacturing process flow of the array substrate can be saved. In some embodiments, the first planarization layer is made of an inorganic material, and the first dielectric layer is made of an inorganic material. The inorganic material included in the first planarization layer may be $SiO_2$, for example; the inorganic material included in the first dielectric layer may be SiN, $SiO_2$, or a $SiN/SiO_2$ stack.

In a specific implementation, for the array substrate shown in FIGS. 7 and 8, the second sub-vias and the first sub-vias are formed through a single patterning process, and the patterns of the second pixel electrodes and the first pixel electrodes are formed through a single patterning process, so that two patterning process flows can be saved.

It should be noted that in FIGS. 7 and 8, as an example, each first via 7 has a trapezoidal cross-sectional shape in a direction perpendicular to the first base substrate 1. Accordingly, each first groove 8 has a trapezoidal cross-sectional shape in the direction perpendicular to the first base substrate 1, and each flat portion 9 has a trapezoidal cross-sectional shape in the direction perpendicular to the first base substrate 1. Alternatively, in a specific implementation, when the material of the first planarization layer is different from the material of the first dielectric layer, an angle between the first sub-via and the plane where the first base substrate is located may be different from an angle between the second sub-via and the plane where the first base substrate is located, that is, a cross-sectional shape of the first via in the direction perpendicular to the first base substrate has a hexagonal shape.

It should be noted that in FIG. 7, the second pixel electrode covers the corresponding flat portion, and in FIG. 8, the second pixel electrode exposes the corresponding flat portion.

It should be noted that compared with the first vias including the second sub-vias and the first sub-vias formed through two patterning processes, the shape of each of the first vias including the second sub-vias and the first sub-vias formed through a single patterning process is more regular, and correspondingly, the shape of each first groove is also more regular. Further, a maximum area of the first groove in the direction parallel to the plane where the first base substrate is located can be reduced. For the scheme that the second pixel electrode exposes the corresponding flat portion, it can reduce the area which cannot be used for controlling liquid crystal molecules to rotate to realize light transmission, so that the aperture ratio can be increased. In a specific implementation, a maximum size of the first via in the direction parallel to the plane where the first base substrate is located is, for example, 3 m.

Figure 9:
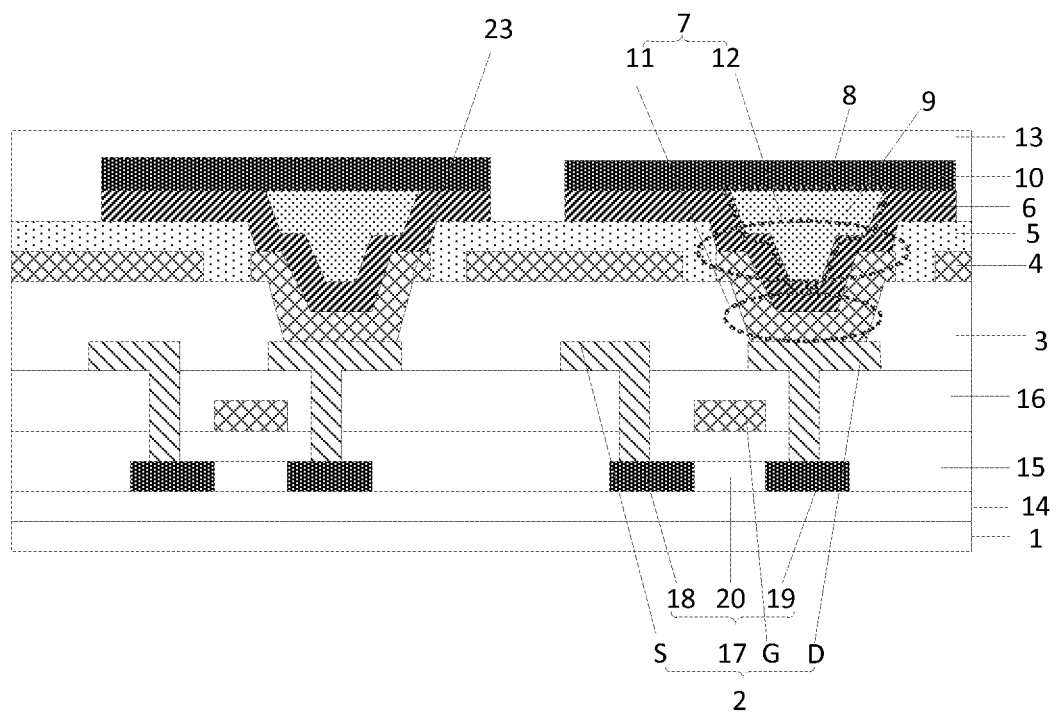
FIG. 9 is a schematic diagram of a structure of another array substrate according to an embodiment of the present disclosure.
Figure 10:
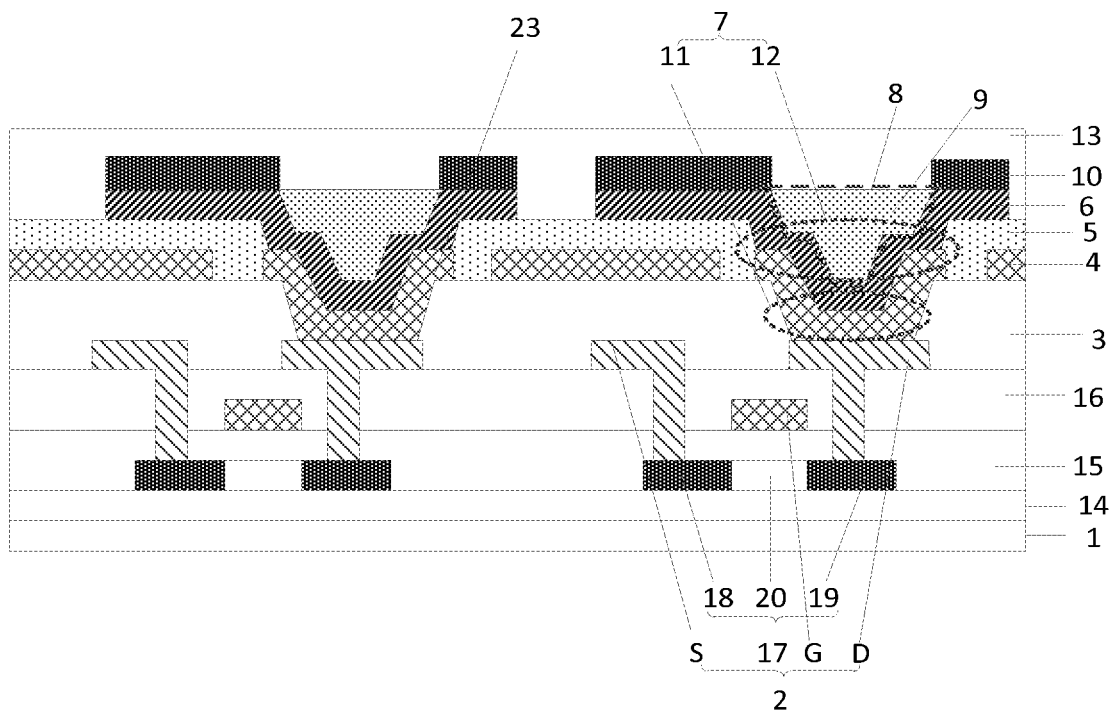
FIG. 10 is a schematic diagram of a structure of another array substrate according to an embodiment of the present disclosure.
Figure 11:
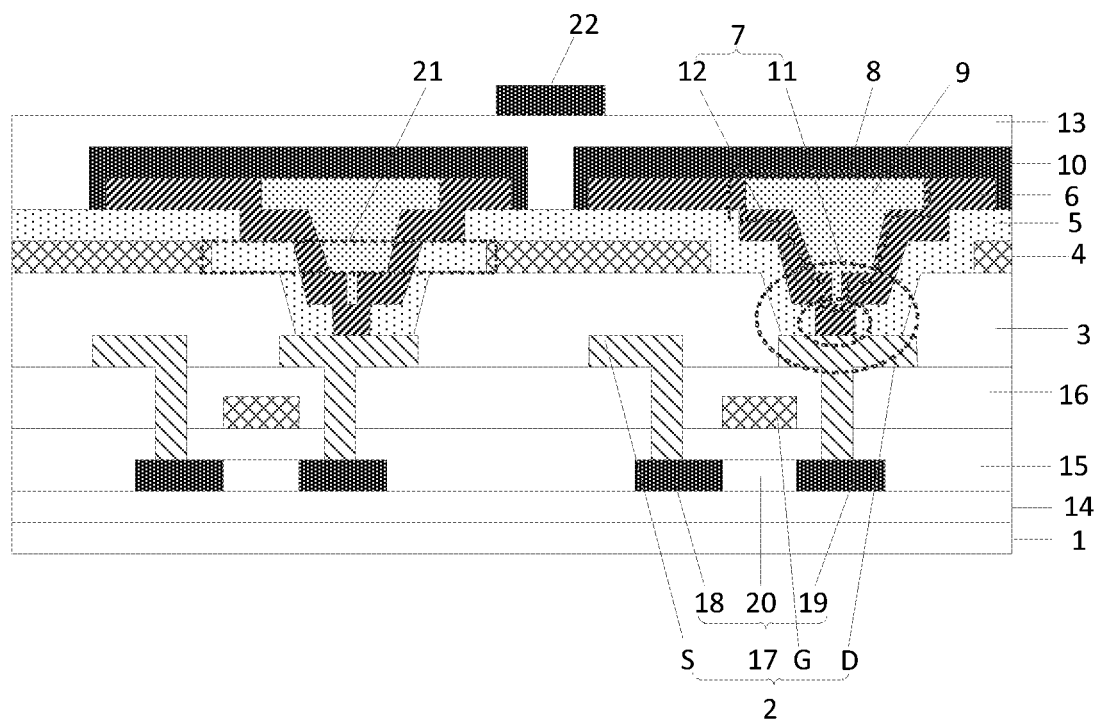
FIG. 11 is a schematic diagram of a structure of another array substrate according to an embodiment of the present disclosure.
Figure 12:
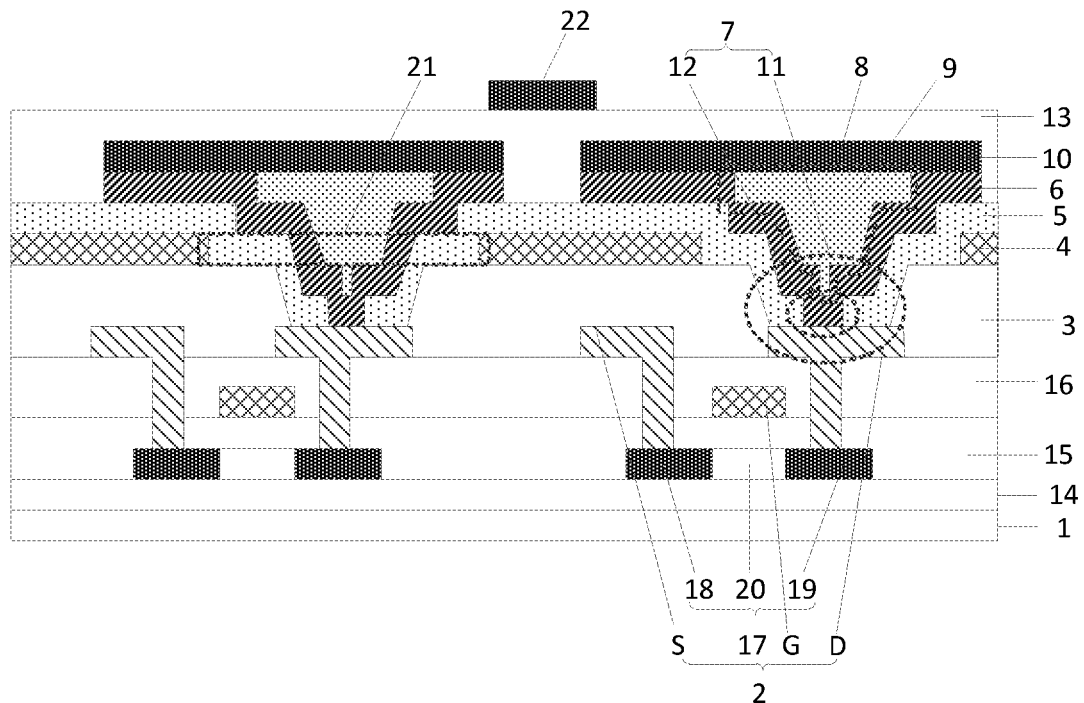
FIG. 12 is a schematic diagram of a structure of another array substrate according to an embodiment of the present disclosure.
Figure 13:
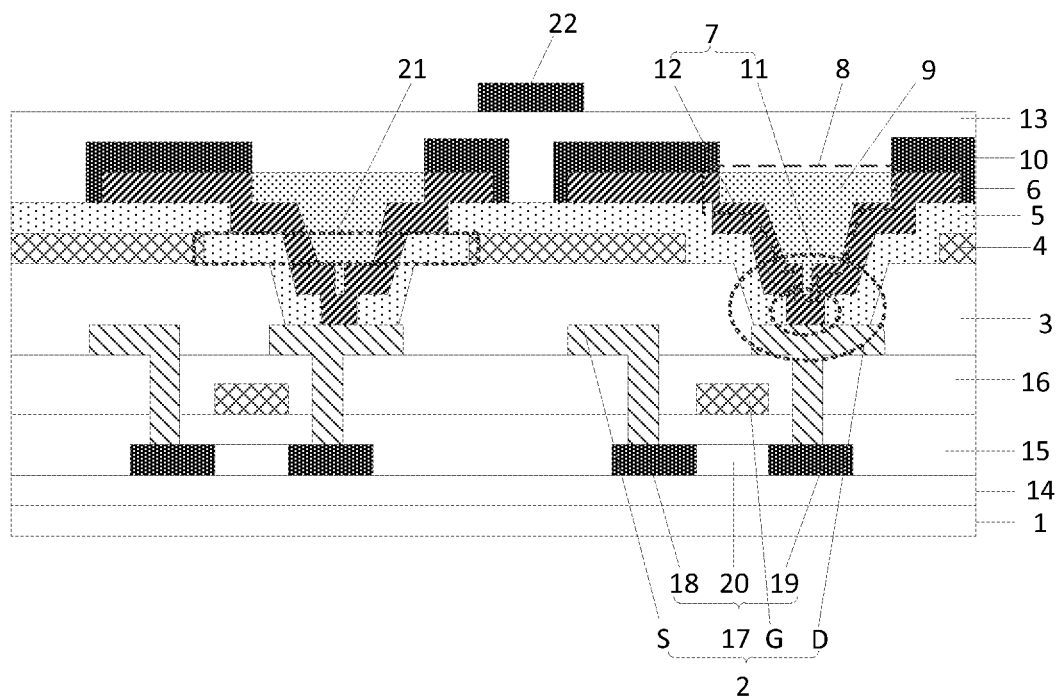
FIG. 13 is a schematic diagram of a structure of another array substrate according to an embodiment of the present disclosure.
Figure 14:
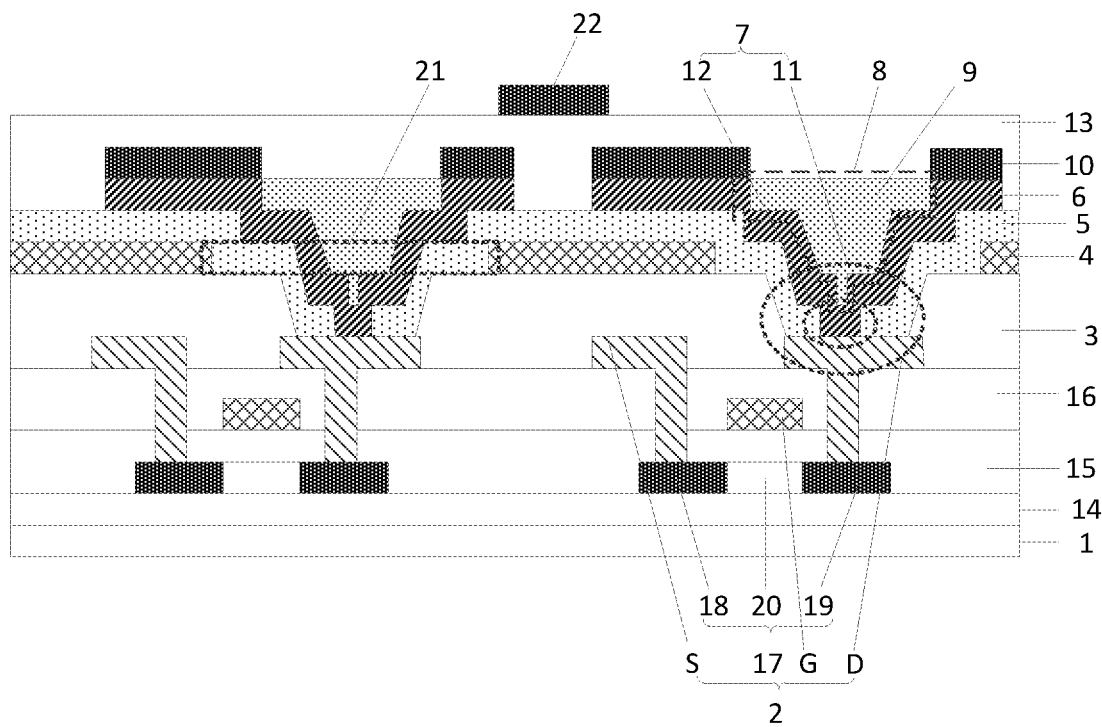
FIG. 14 is a schematic diagram of a structure of another array substrate according to an embodiment of the present disclosure.

In some embodiments, as shown in FIGS. 9 and 10, in the direction from the first pixel electrode 6 to the first base substrate 1, the cross-sectional area of the first sub-via 11 in the direction parallel to a plane where the first base substrate is located gradually decreases, the cross-sectional area of the second sub-via 12 in the direction parallel to the plane where the first base substrate is located gradually decreases, and the maximum cross-sectional area of the first sub-via 11 in the direction parallel to the plane where the first base substrate is located is greater than the minimum cross-sectional area of the second sub-via 12 in the direction parallel to the plane where the first base substrate is located.

The array substrate further includes:

A plurality of first connection electrodes 23 disposed in the same layer as the common electrode 4 and each covering the corresponding first sub-via 11; each first connection electrode 23 is in contact with the corresponding first pixel electrode 6 and the corresponding thin film transistor 2.

That is, each first pixel electrode is electrically connected to the corresponding thin film transistor through the corresponding first connection electrode disposed in the same layer as the common electrode.

It should be noted that in FIG. 9, each second pixel electrode covers the corresponding flat portion, and in FIG. 10, each second pixel electrode exposes the corresponding flat portion.

According to the array substrate provided by the embodiment of the present disclosure, patterns of the first connection electrodes are formed in the first vias while a pattern of the common electrode is formed, so that the process of electrically connecting the first pixel electrodes and the corresponding thin film transistors is simple and easy to implement, it can avoid the lapping disconnection caused by a direct contact of the first pixel electrodes with the thin film transistors through the deep first vias, and the yield of the array substrate can be improved.

In some embodiments, as shown in FIGS. 9 and 10, an area of the orthographic projection of each first sub-via 11 on the first base substrate 1 is less than an area of an orthographic projection of the corresponding first connection electrode 23 on the first base substrate 1, and the orthographic projection of each first sub-via 11 on the first base substrate 1 falls within the orthographic projection of the corresponding first connection electrode 23 on the first base substrate 11. That is, each first connection electrode covers a portion of the first planarization layer, in addition to an area where the corresponding first sub-via is located.

In some embodiments, a width of the orthographic projection of each first sub-via on the first base substrate is greater than or equal to 3 microns and less than or equal to 4 microns. That is, each first sub-via has a less size. In the case where the second pixel electrode exposes the corresponding flat portion, it can reduce an area that cannot be used for controlling liquid crystal molecules to rotate to achieve light transmission, so that the aperture ratio can be increased.

In a specific implementation, the first planarization layer is made of an organic material, and the first dielectric layer is made of an inorganic material. The organic material may be, for example, a photosensitive resin. The inorganic material may be silicon nitride (SiN), silicon oxide ($SiO_2$), or a $SiN/SiO_2$ stack.

In some embodiments, when the array substrate is applied to the reflective liquid crystal display, as shown in FIGS. 11 to 14, the array substrate further includes:

A first protective layer 13 located on a side of the second pixel electrodes 10 away from the first base substrate 1;

A plurality of floating reflective patterns 22 on a side of the first protective layer 13 away from the second pixel electrodes 10; an orthographic projection of each floating reflective pattern 22 on the first base substrate 1 covers a gap between the orthographic projections of the adjacent second pixel electrodes 10 on the first base substrate 1.

In the array substrate provided by the embodiment of the present disclosure, the floating reflective patterns are provided for covering the gap between the adjacent second pixel electrodes, so that a coverage area of the reflective layer can be increased, and the reflectivity can be increased.

In some embodiments, as shown in FIGS. 11 to 14, the orthographic projection of each floating reflective pattern 22 on the first base substrate 1 overlaps with the orthographic projection of the corresponding second pixel electrode 10 on the first base substrate 1.

In a specific implementation, in the arrangement direction of two adjacent second pixel electrodes, the overlapping area of the orthographic projection of each floating reflective pattern on the first base substrate and the orthographic projection of the corresponding second pixel electrode on the first base substrate has a width of about 1 micrometer.

In some embodiments, when the array substrate includes the second pixel electrodes, a distance between two adjacent second pixel electrodes is greater than 0 and less than or equal to 2.5 micrometers. That is, the distance between two adjacent second pixel electrodes is small, so that the reflectivity can be increased.

Figure 15:
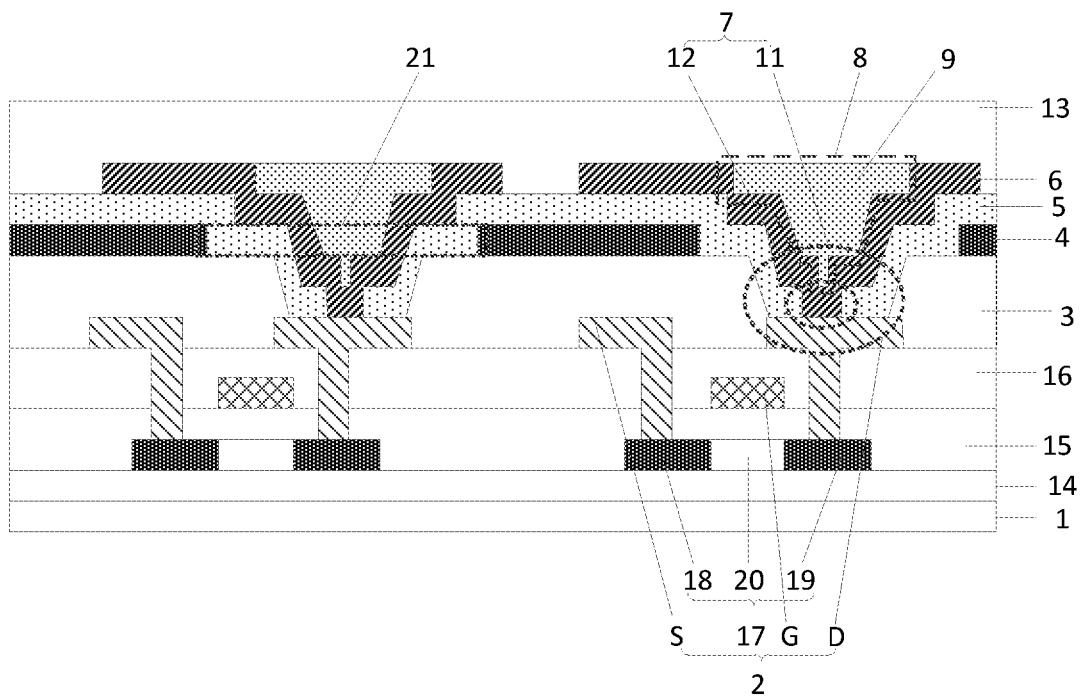
FIG. 15 is a schematic diagram of a structure of another array substrate according to an embodiment of the present disclosure.

It should be noted that in a specific implementation, the reflective liquid crystal display may also be implemented without the second pixel electrodes. In some embodiments, as shown in FIG. 15, the array substrate includes the common electrode 4 and the first pixel electrodes 6, the second pixel electrodes are not provided on a side of the first pixel electrodes 6 away from the first base substrate 1, a material of the common electrode includes a reflective material, and a material of the first pixel electrodes includes a transparent material. That is, the common electrode also acts as a reflective electrode. Therefore, a thickness of the array substrate can be reduced, and the process flow for manufacturing the array substrate can be reduced.

In some embodiments, as shown in FIGS. 1 to 4, 6 to 15, and 16, each thin film transistor 2 includes: an active layer 17, a gate electrode G, a source electrode S, and a drain electrode D; the drain electrode D is electrically connected to the corresponding first pixel electrode 6.

In some embodiments, the drain electrode includes a transparent material.

It should be noted that the drain electrode is electrically connected to the first pixel electrode, the drain electrode is usually close to a gap between the adjacent first pixel electrodes, and light is easily reflected at the drain electrode near the gap between the adjacent first pixel electrodes when the drain electrode is made of a conventional metal material. According to the array substrate provided by the embodiment of the present disclosure, the drain electrode includes the transparent material, so that the light reflection of the drain electrode near the gap between the adjacent first pixel electrodes can be avoided.

In some embodiments, as shown in FIGS. 1 to 4 and 6 to 15, the source electrode S and the drain electrode D are disposed in the same layer.

Figure 16:
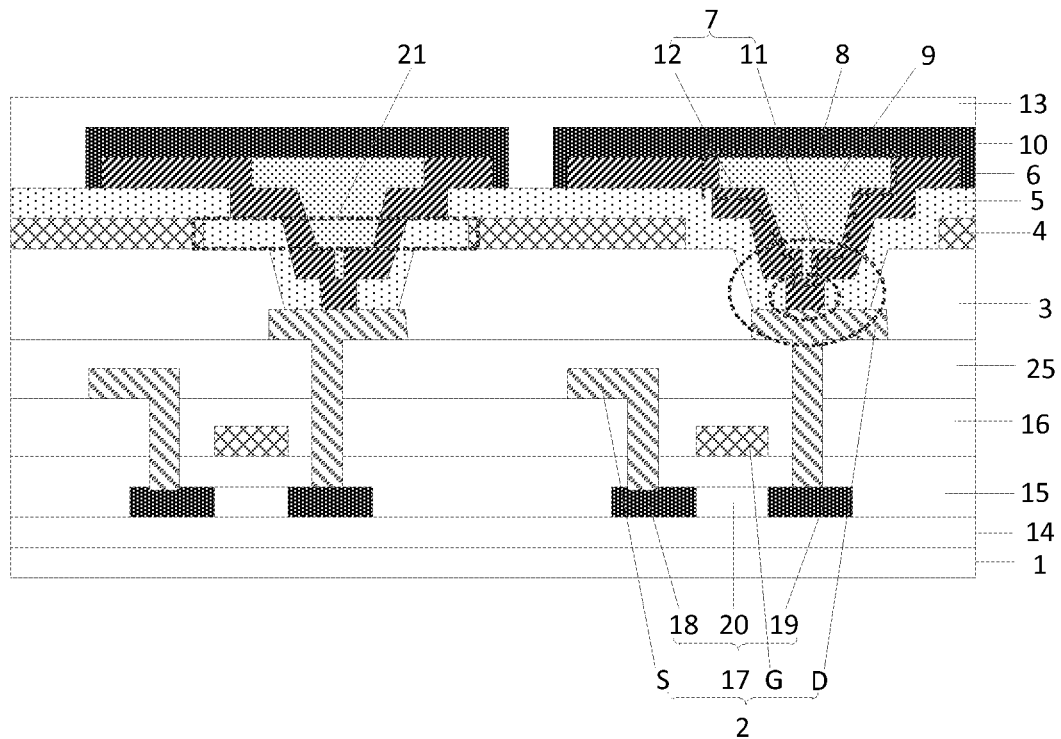
FIG. 16 is a schematic diagram of a structure of another array substrate according to an embodiment of the present disclosure.

Alternatively, in some embodiments, as shown in FIG. 16, the source electrode S is located between the drain electrode D and the first base substrate 1.

In other words, in the embodiment of the present disclosure, the source electrode and the drain electrode are disposed in different conductive layers, so that even if a distance between an edge of an orthographic projection of the source electrode on the first base substrate and an edge of an orthographic projection of the drain electrode on the first base substrate is reduced, a short circuit between the source electrode and the drain electrode is not caused. In this way, the difficulty for designing a layout of the array substrate can be reduced. The distance between the edge of the orthographic projection of the source electrode on the first base substrate and the edge of the orthographic projection of the drain electrode on the first base substrate can be reduced, so that a size of the sub-pixel unit can be reduced, a high pixel density can be realized, the resolution can be improved, and a high-resolution display can be realized.

In some embodiments, a pixel density of the array substrate provided by the embodiments of the present disclosure is greater than or equal to 1000. That is, the array substrate provided by the embodiment of the present disclosure may be applied to high-resolution display products. It should be noted that when the pixel density is 1000, a resolution of a display product provided with the array substrate is, for example, 2000×2000. In order to achieve a higher resolution, the pixel density of the array substrate may be further increased, for example, the pixel density may be greater than or equal to 2500, or even greater than or equal to 4000.

In some embodiments, as shown in FIGS. 1 to 4, 6 to 15, and 16, the active layer 17 is located between the drain electrode D and the first base substrate 1;

The array substrate further includes: insulating layers between the drain electrode D and the active layer 17.

In some embodiments, as shown in FIGS. 1 to 4, 6 to 15, and 16, each thin film transistor 2 has a top gate structure, and the gate electrode G is located between the active layer 17 and the source electrode S; as shown in FIGS. 1 to 4 and 6 to 15, when the source electrode S and the drain electrode D are disposed in the same layer, the insulating layers between the drain electrode D and the active layer 17 include: a gate insulating layer 15 between the active layer 17 and the gate electrode G; a first interlayer insulating layer 16 between the gate electrode G and the source electrode S and the drain electrode D; as shown in FIG. 16, when the source electrode S and the drain electrode D are located in different layers, the insulating layers located between the drain electrode D and the active layer 17 include: the gate insulating layer 15 between the active layer 17 and the gate electrode G, the first interlayer insulating layer 16 between the gate electrode G and the source electrode S, and a second interlayer insulating layer 25 between the source electrode S and the drain electrode D.

In some embodiments, as shown in FIGS. 1 to 4, 6 to 15, and 16, the active layer 17 includes: a first conductorized region 19, a second conductorized region 18 and a semiconductor region 20; an orthographic projection of the gate electrode G on the first base substrate 1 falls within an orthographic projection of the semiconductor region 20 on the first base substrate 1; the drain electrode D is electrically connected to the first conductorized region 19 through a second via extending through the insulating layers; when the source electrode S and the drain electrode D are located in the same layer, the second via extends through the first interlayer insulating layer 16 and the gate insulating layer 15; when the source electrode S and the drain electrode D are located in different layers, the second via extends through the second interlayer insulating layer 25, the first interlayer insulating layer 16, and the gate insulating layer 15; the source electrode S is electrically connected to the second conductorized region 18 through a third via extending through the first interlayer insulating layer 16 and the gate insulating layer 15.

In some embodiments, as shown in FIGS. 1 to 4, 6 to 15, and 16, the array substrate further includes a buffer layer 14 between the active layer 17 and the first base substrate 1.

Figure 17:
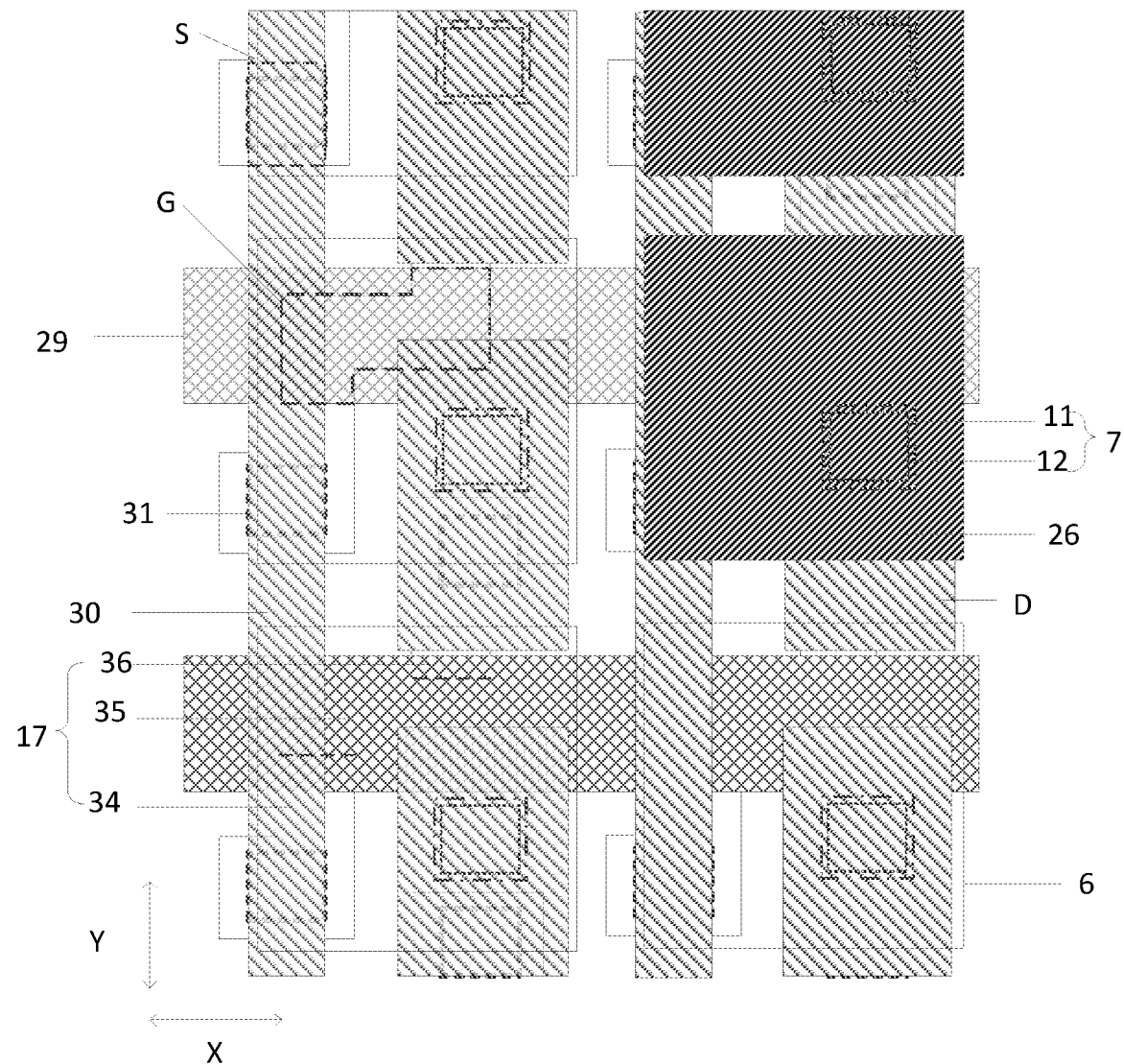
FIG. 17 is a schematic diagram of a structure of another array substrate according to an embodiment of the present disclosure.

In some embodiments, as shown in FIG. 17, the orthographic projection of each first via 7 on the first base substrate does not overlap with an orthographic projection of each second via 26 on the first base substrate. Therefore, the uniformity of the liquid crystal cell gap can be prevented from being influenced by a great difference between a flatness of an area where the via is located and a flatness of other area caused by different vias overlapping with each other.

In some embodiments, as shown in FIG. 17, the array substrate specifically includes a plurality of scanning lines 29 and a plurality of data lines 30 crossing each other in horizontal and vertical directions; the plurality of scanning lines 29 and the plurality of data lines 30 divide a plurality of sub-pixel units; the plurality of scanning lines 29 extend along a first direction X and are arranged along a second direction Y, and the plurality of data lines extend along the second direction Y and are arranged along the first direction X; the first direction X intersects the second direction Y; the plurality of sub-pixel units are divided into: a plurality of sub-pixel unit rows extending along the first direction X and arranged along the second direction Y, and a plurality of sub-pixel unit columns extending along the second direction Y and arranged along the first direction X, wherein each sub-pixel unit row includes a scanning line 29 electrically connected to the thin film transistors included in the sub-pixel unit row, and each sub-pixel unit column includes a data line 30 electrically connected to the thin film transistors included in the sub-pixel unit column.

In some embodiments, as shown in FIG. 17, each scanning line 29 is located between the corresponding drain electrode S and the active layer 17 in the direction perpendicular to the first base substrate; a part, an orthographic projection of which on the first base substrate overlaps with the orthographic projection of the active layer 17 on the first base substrate, of the scanning line 29 is the gate electrode G.

The orthographic projection of each first pixel electrode 6 on the first base substrate overlaps with an orthographic projection of the scanning line 29, in a sub-pixel unit row adjacent to the sub-pixel unit row where the first pixel electrode 6 is located, on the first base substrate.

That is, according to the array substrate provided by the embodiment of the present disclosure, the orthographic projection of each first pixel electrode on the first base substrate overlaps with the orthographic projection of the scanning line in the same row on the first base substrate, so that the voltage holding capability of the first pixel electrode can be increased while the light emission of the current sub-pixel unit row is not affected.

In a specific implementation, the scanning lines are located between the gate insulating layer and the first interlayer insulating layer.

In some embodiments, as shown in FIG. 17, the orthographic projection of each first pixel electrode 6 on the first base substrate overlaps with an orthographic projection of the data line 30 in the same sub-pixel unit column as the first pixel electrode 6 on the first base substrate.

In the array substrate provided by the embodiment of the present disclosure, the orthographic projection of each first pixel electrode on the first base substrate overlaps with the orthographic projection of the data line included in the sub-pixel unit column where the first pixel electrode is located on the first base substrate, so that light noise caused by the data line can be shielded, and the potential on the data lines in other columns is not influenced.

It should be noted that in FIG. 17, it is exemplified that a width of the region where the orthographic projection of each first pixel electrode 6 on the first base substrate and the orthographic projection of the corresponding data line 30 on the first base substrate overlap with each other in the first direction X is less than the width of the data line 30. Alternatively, the width of the region where the orthographic projection of each first pixel electrode on the first base substrate and the orthographic projection of the corresponding data line on the first base substrate overlap with each other in the first direction may be equal to the width of the data line, so as to further increase the area of each first pixel electrode and improve the aperture ratio.

In some embodiments, as shown in FIG. 17, the source electrode S is located in an area of the data line where the data line 30 is electrically connected to the active layer 17.

In some embodiments, the data lines are located between the first interlayer insulating layer and the first planarization layer.

Figure 18:
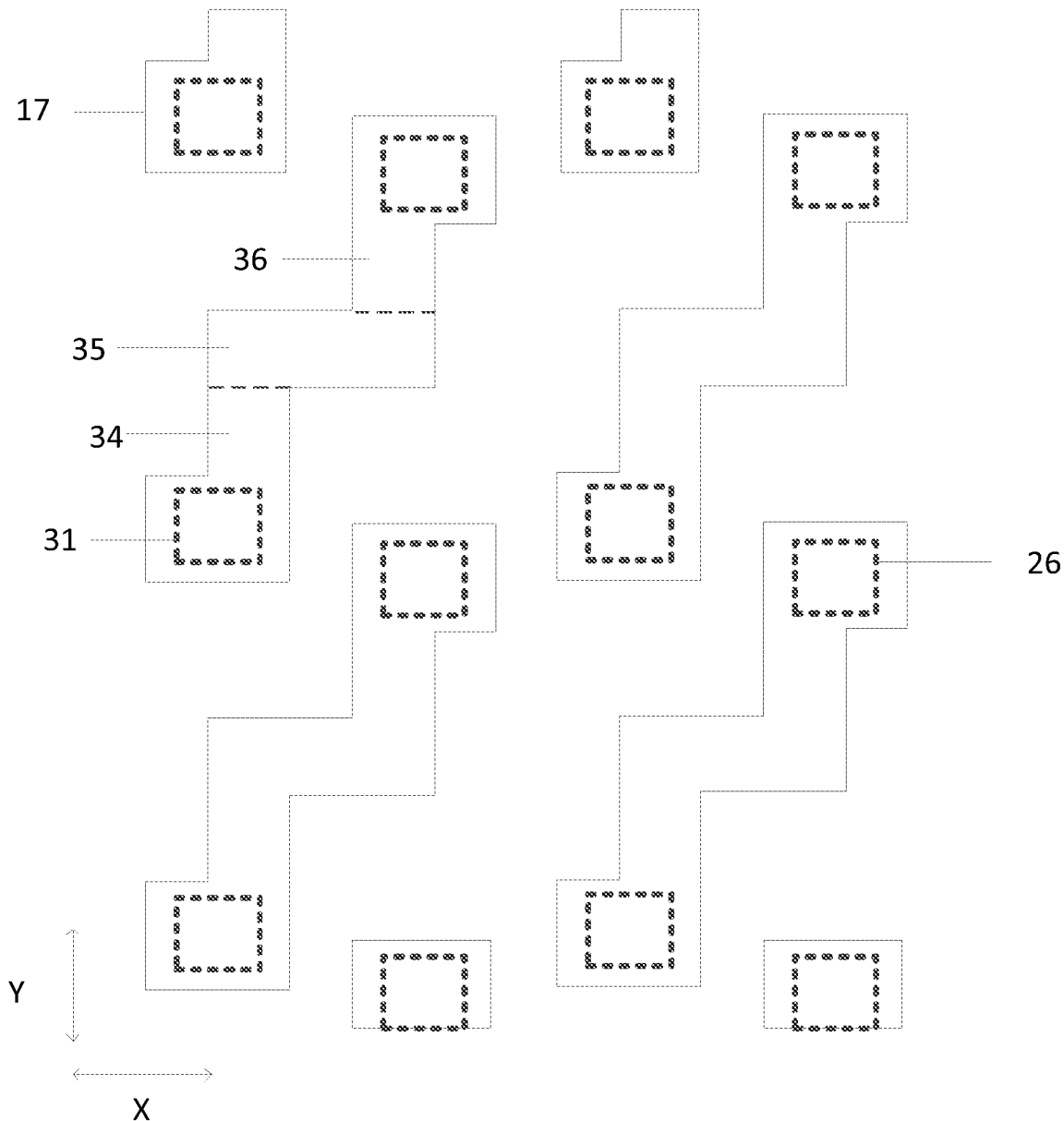
FIG. 18 is a schematic diagram of a structure of an active layer according to an embodiment of the present disclosure.

It should be noted that FIG. 18 shows patterns of the active layers 17, the second vias 26, and the third vias 31 in the region shown in FIG. 17; in FIG. 17, a region of the active layer overlapping with the scanning line 29 is the semiconductor region of the active layer, and a region of the active layer not overlapping with the scanning line 29 is the conductorized region of the active layer. The regions corresponding to the second vias 26 and the third vias 31 may be the first conductorized region and the second conductorized region, respectively. In FIG. 18, as an example, lines sequentially connecting centers of the second vias 26 and the third vias 31 in the adjacent sub-pixel unit rows are not on a horizontal line extending along the first direction X. In a specific implementation, the lines sequentially connecting the centers of the second vias 26 and the third vias 31 in the adjacent sub-pixel unit rows may alternatively be provided to be on a horizontal line extending along the first direction X.

Figure 19:
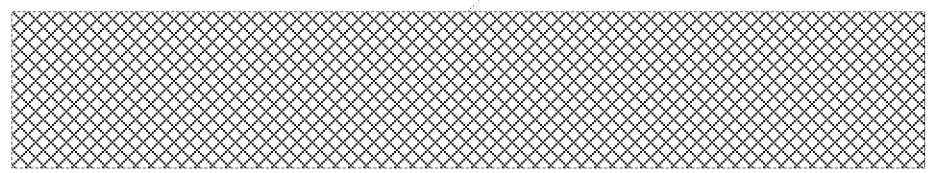
FIG. 19 is a schematic diagram of a structure of a scan line according to an embodiment of the present disclosure.
Figure 19:
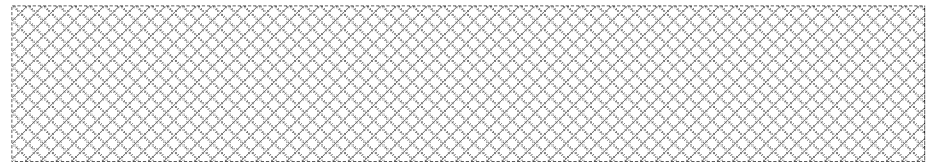
Figure 19:
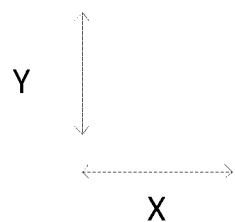

It should be noted that FIG. 19 shows patterns of orthographic projections of the scanning lines 29 on the first base substrate in the region shown in FIG. 17.

Figure 20:
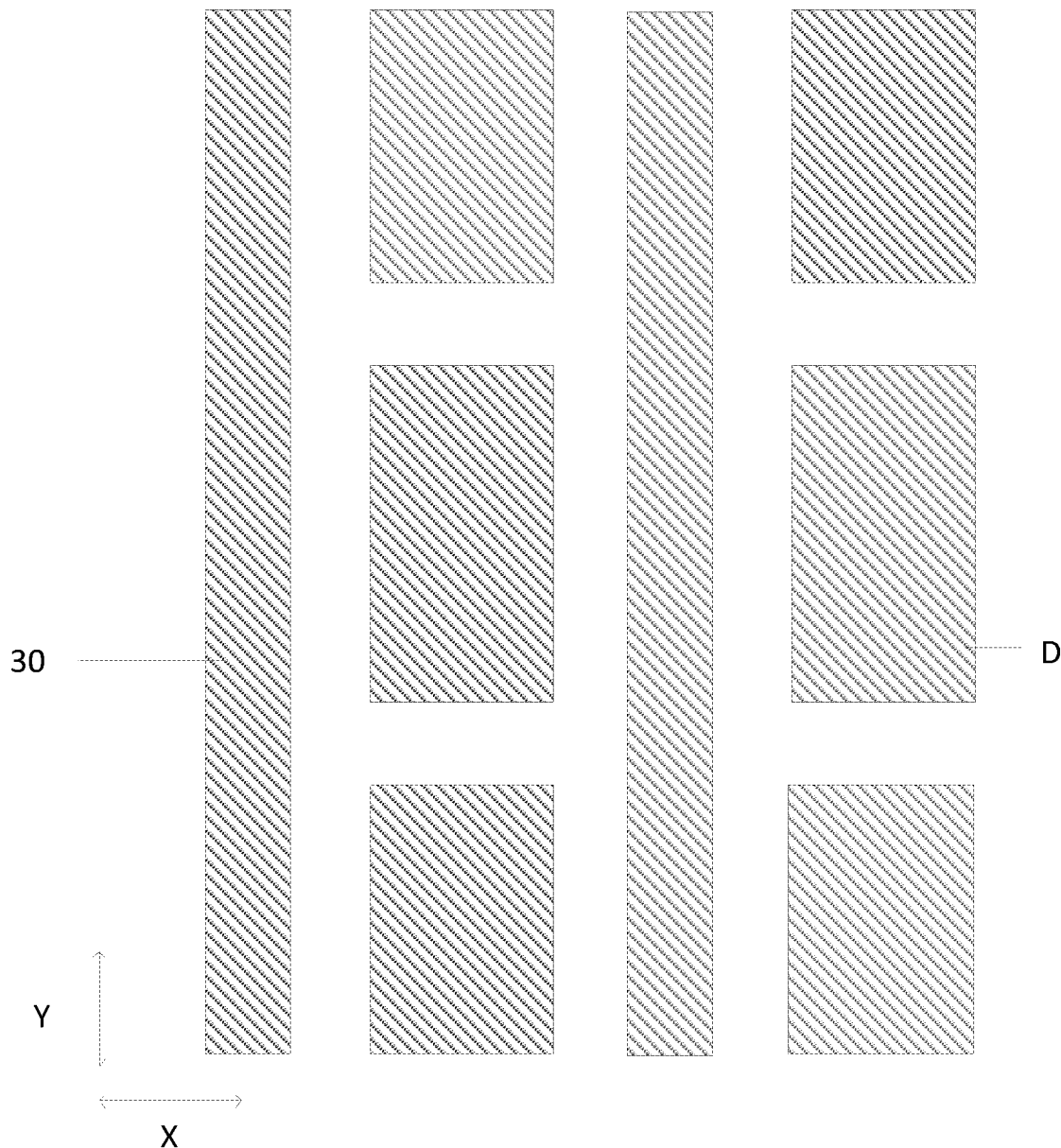
FIG. 20 is a schematic diagram of a structure of a data line and a drain electrode according to an embodiment of the present disclosure.
Figure 23:
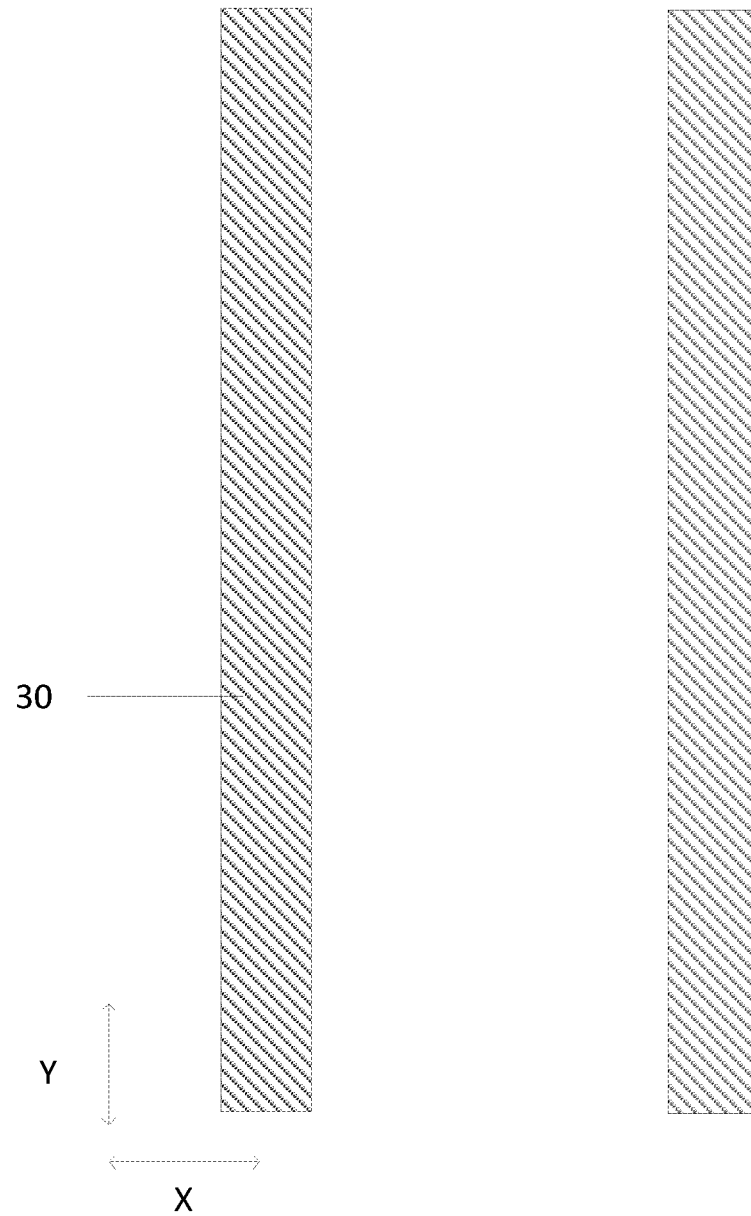
FIG. 23 is a schematic diagram of a structure of a data line according to an embodiment of the present disclosure.
Figure 24:
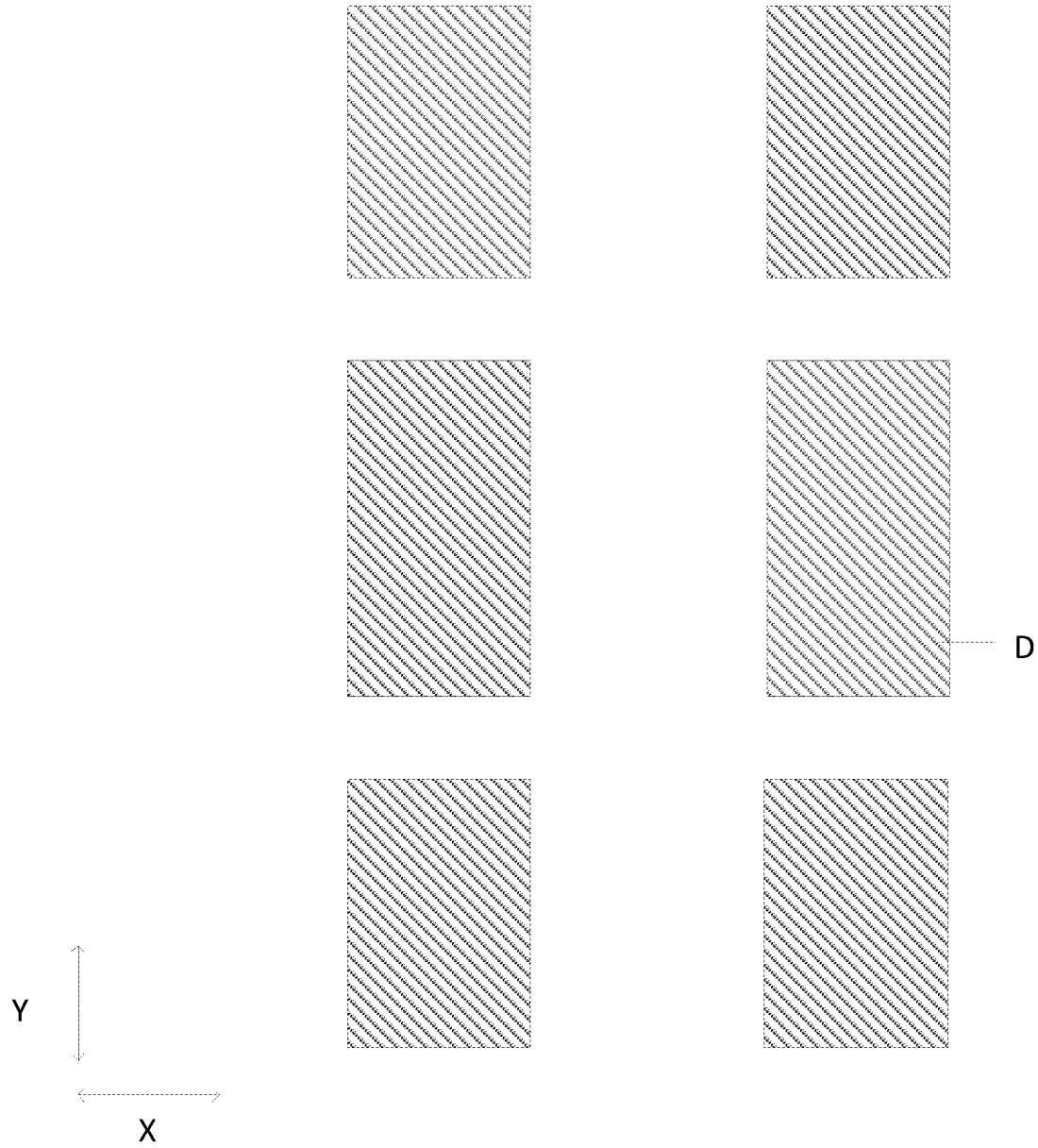
FIG. 24 is a schematic diagram of a structure of a drain electrode according to an embodiment of the present disclosure.

It should be noted that FIG. 20 shows patterns of orthographic projections of the data lines 30 and the drain electrodes D on the first base substrate in the region shown in FIG. 17. FIGS. 17 and 20 illustrate an example in which the data lines 30 and the drain electrodes D are disposed in the same layer; when the data lines 30 and the drain electrodes D are disposed in different layers, a pattern of a layer where the data lines 30 are located and a pattern of a layer where the drain electrodes D are located are respectively shown in FIGS. 23 and 24. When the data lines and the drain electrodes are located in different layers, both the data lines and the drain electrodes may include a metal electrode material, or alternatively, the data lines may include a metal electrode material and the drain electrodes may include a transparent electrode material.

Figure 21:
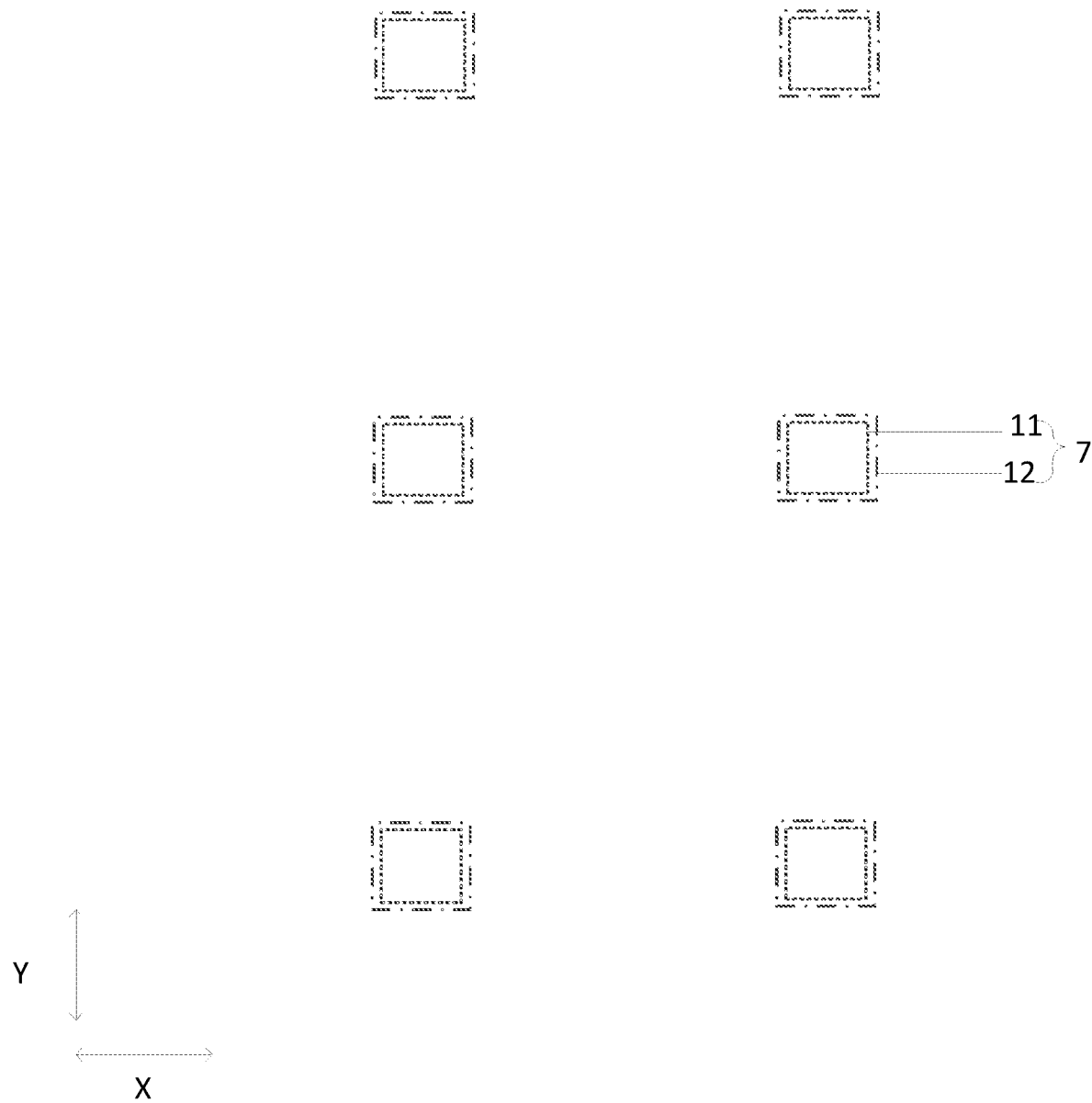
FIG. 21 is a schematic diagram of a structure of a first via according to an embodiment of the present disclosure.

It should be noted that FIG. 21 shows patterns of orthographic projections of the first vias 7 on the first base substrate in the region shown in FIG. 17; in FIGS. 17 and 21, as an example, the area of the first sub-via 11 is less than the area of the corresponding second sub-via 12, and the orthographic projection of the first sub-via 11 on the first base substrate falls within the orthographic projection of the corresponding second sub-via 12 on the first base substrate.

Figure 22:
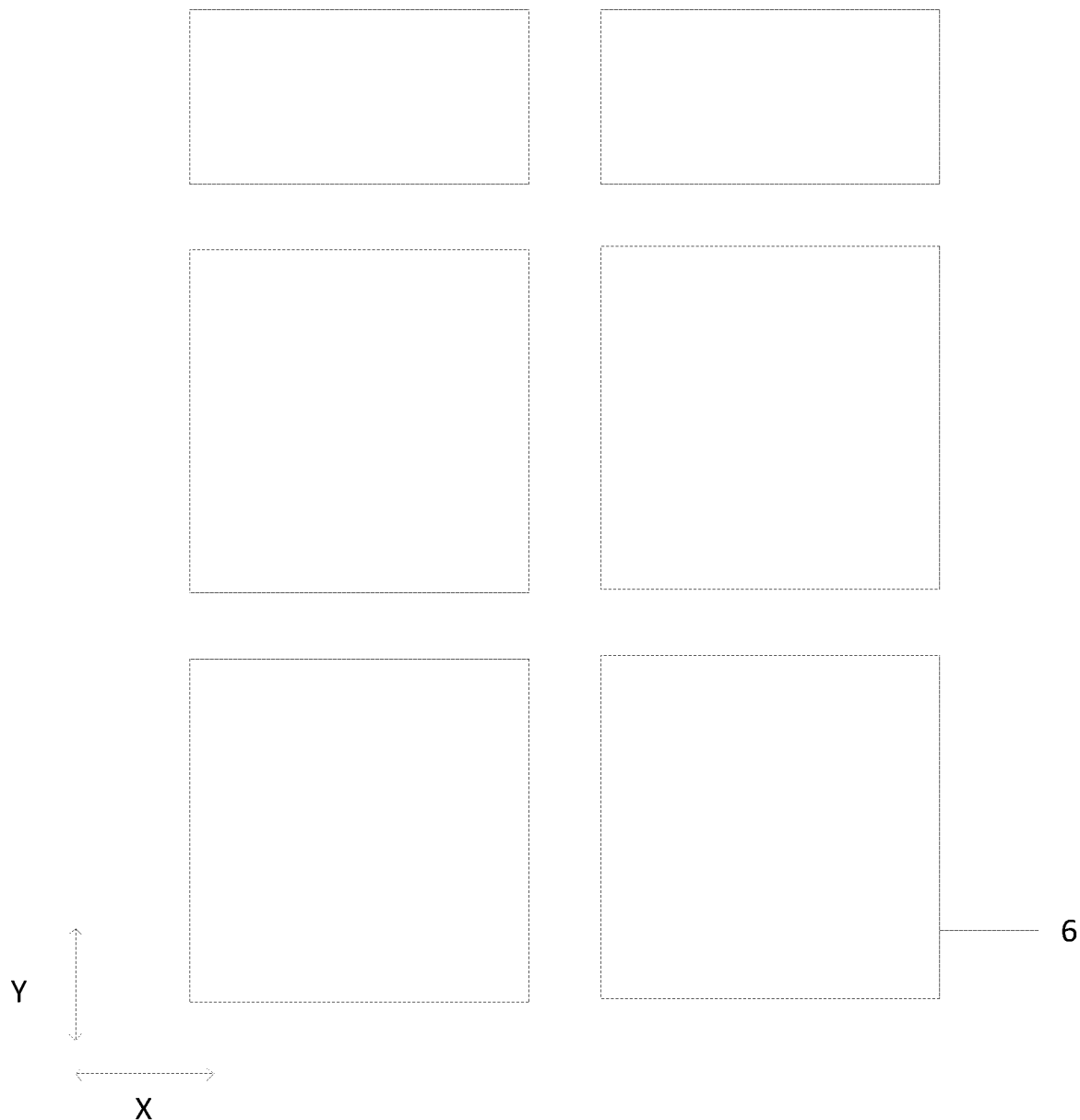
FIG. 22 is a schematic diagram of a structure of a first pixel electrode according to an embodiment of the present disclosure.

It should be noted that FIG. 22 shows patterns of orthographic projections of the first pixel electrodes 6 on the first base substrate in the region shown in FIG. 17.

Figure 25:
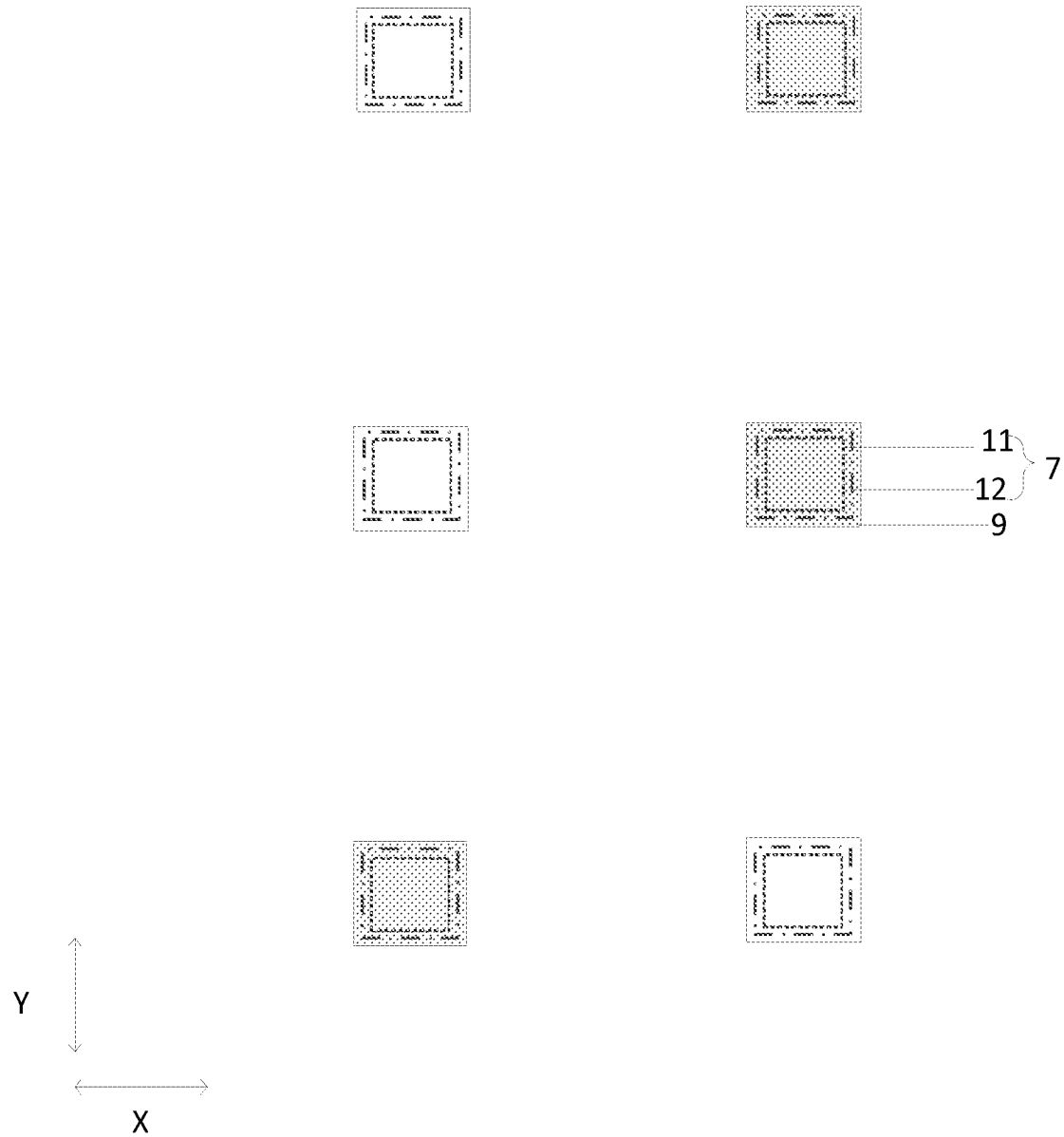
FIG. 25 is a schematic diagram of a structure of a flat portion according to an embodiment of the present disclosure.

It should be noted that FIG. 17 does not show patterns of the flat portions. In a specific implementation, the patterns of the orthographic projections of the flat portions on the first base substrate may be, for example, as shown in FIG. 25.

Figure 26:
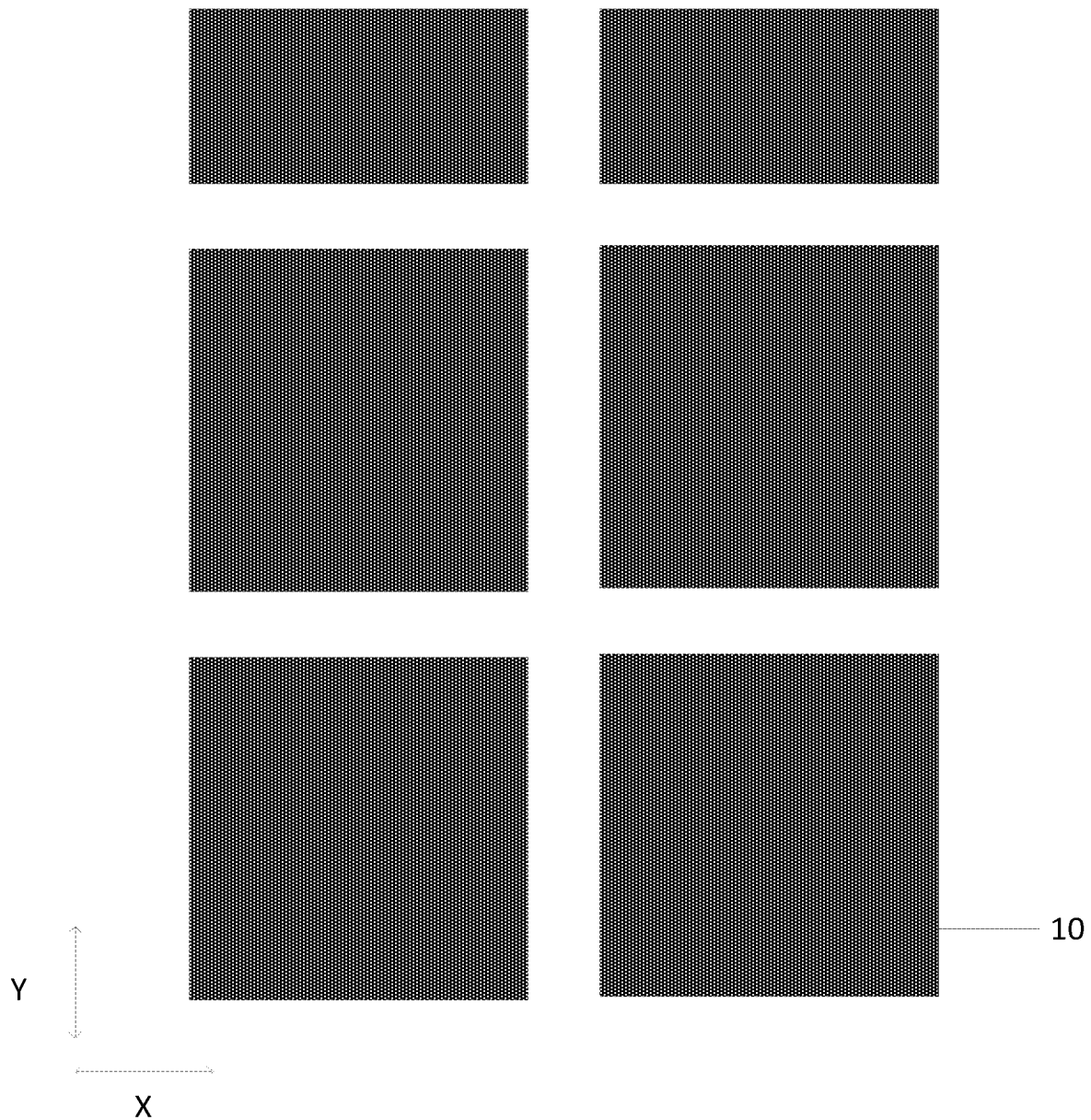
FIG. 26 is a schematic diagram of a structure of a second pixel electrode according to an embodiment of the present disclosure.
Figure 27:
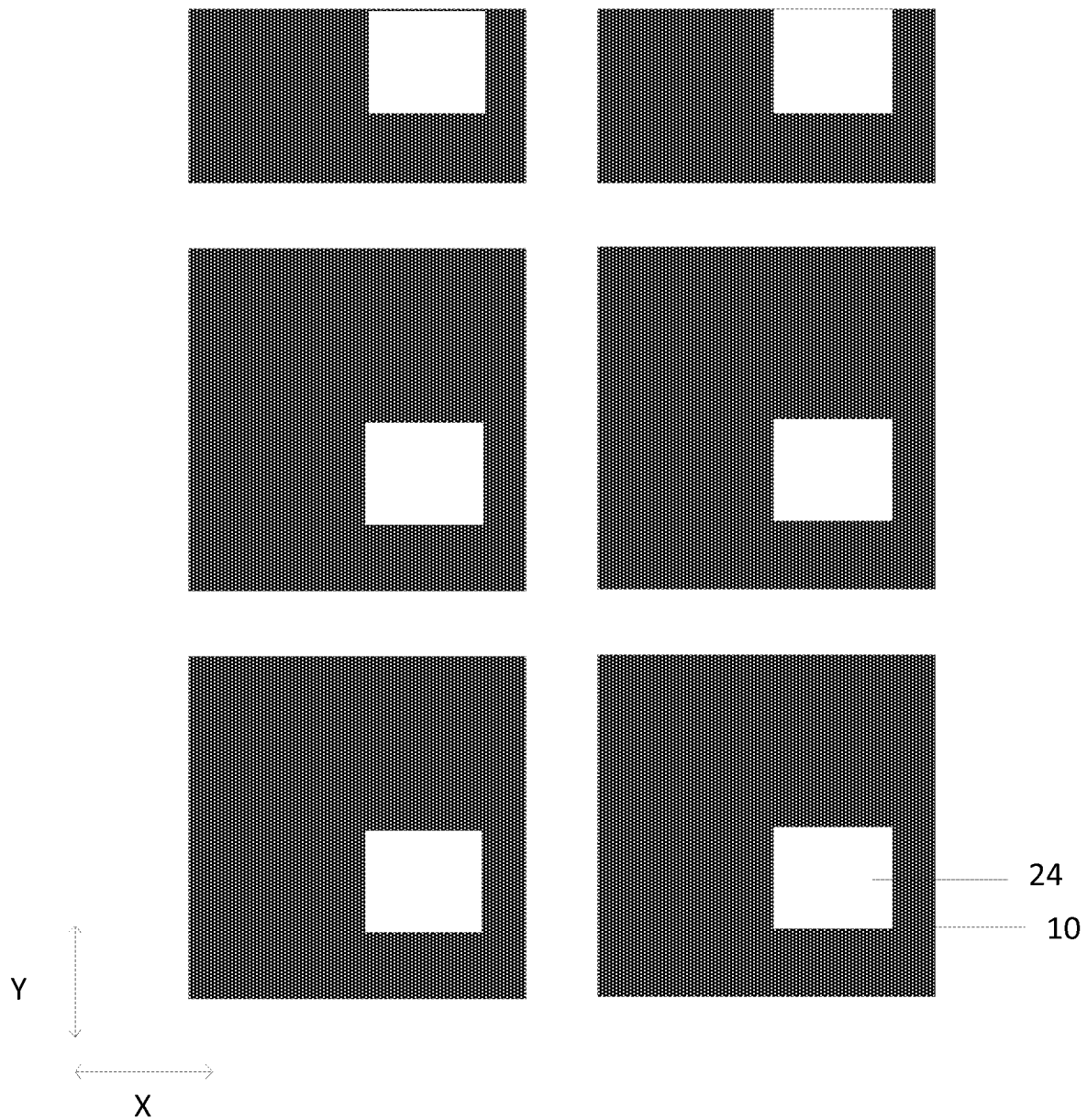
FIG. 27 is a schematic diagram of a structure of another second pixel electrode according to an embodiment of the present disclosure.

It should be noted that when the array substrate further includes the second pixel electrodes, a shape of an outline of the orthographic projection of each second pixel electrode on the first base substrate is the same as that of each first pixel electrode on the first base substrate. In a specific implementation, the pattern of each second pixel electrode is as shown in FIGS. 26 and 27. The orthographic projection of each second pixel electrode 10 on the first base substrate shown in FIG. 26 covers the orthographic projection of the corresponding first pixel electrode on the first base substrate; the second pixel electrode 10 shown in FIG. 27 includes the first opening 24.

In some embodiments, as shown in FIGS. 17 and 22, the orthographic projection of each first pixel electrode 6 on the first base substrate is rectangular.

Accordingly, as shown in FIGS. 26 and 27, when the array substrate further includes the second pixel electrodes, the shape of the outline of the orthographic projection of each second pixel electrode on the first base substrate is rectangular.

In some embodiments, at least one edge of the orthographic projection of each first via on the first base substrate and a corresponding edge of the orthographic projection of the first pixel electrode on the first base substrate in each of the first direction X and the second direction Y have an overlapping area therebetween. Therefore, the orthographic projection of each first via on the first base substrate is close to the edge of the orthographic projection of the corresponding first pixel electrode on the first base substrate, which can ensure the flatness of most areas of the first pixel electrode.

Figure 28:
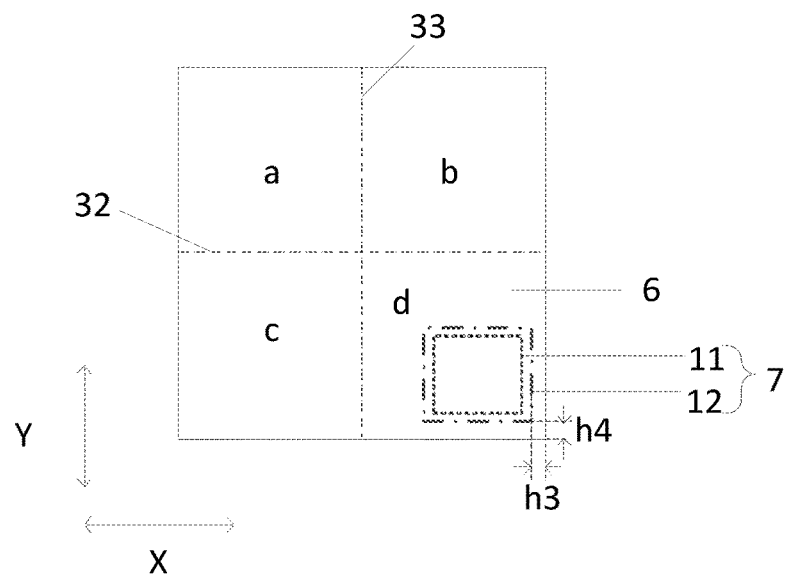
FIG. 28 is a schematic diagram illustrating a positional relationship between a first pixel electrode and a first via according to an embodiment of the present disclosure.

It should be noted that in consideration of the misalignment and the size variations of the first vias and the first pixel electrodes, it is not easily realized in actual manufacturing process that the at least one edge of the orthographic projection of each first via on the first base substrate and the corresponding edge of the orthographic projection of the first pixel electrode on the first base substrate in each of the first direction X and the second direction Y have an overlapping area therebetween. Therefore, in some embodiments, by design, an edge of the orthographic projection of the first via 7 on the first base substrate close to an edge of the first pixel electrode 6 and the edge of the orthographic projection of the first pixel electrode 6 on the first base substrate in each of the first direction X and the second direction Y have a distance therebetween, as shown in FIG. 17 and FIG. 28. When the edge of the orthographic projection of the first via on the first base substrate close to the edge of the first pixel electrode and the edge of the orthographic projection of the first pixel electrode on the first base substrate in each of the first direction X and the second direction Y have a less distance therebetween, the orthographic projection of the first via on the first base substrate is still close to the edge of the orthographic projection of the first pixel electrode on the first base substrate, which can still ensure the flatness of most areas of the first pixel electrode.

It should be noted that in FIG. 28, as an example, the orthographic projection of the first sub-via 11 on the first base substrate falls within the orthographic projection of the corresponding second sub-via 12 on the first base substrate, and the edge of the orthographic projection of the first via 7 on the first base substrate close to the edge of the first pixel electrode 6 in each of the first direction X and the second direction Y is an edge of the orthographic projection of the first sub-via 11 on the first base substrate close to the edge of the first pixel electrode 6. In FIG. 28, h3 and h4 are distances between the edge of the orthographic projection of the first sub-via 11 on the first base substrate close to the edge of the first pixel electrode 6 and the edge of the orthographic projection of the first pixel electrode on the first base substrate in the first direction X and the second direction Y, respectively.

In some embodiments, a minimum distance between the edge of the orthographic projection of the first via on the first base substrate close to the edge of the first pixel electrode and the edge of the orthographic projection of the first pixel electrode on the first base substrate in each of the first direction X and the second direction Y is less than or equal to 1.5 micrometers. That is, there is the less distance between the edge of the orthographic projection of the first via on the first base substrate and the edge of the orthographic projection of the first pixel electrode on the first base substrate, which can still ensure the flatness of most areas of the first pixel electrode. Especially for the scheme that the second pixel electrodes are not provided or each second pixel electrode is provided with the first opening, the flatness of most areas of the first pixel electrode is ensured, and thus, the aperture ratio can be ensured.

In some embodiments, as shown in FIG. 28, the orthographic projection of the first via 7 on the first base substrate is close to one right angle of the rectangular shape of the orthographic projection of the first pixel electrode 6 on the first base substrate. That is, the distance between each edge of the orthographic projection of the first via on the first base substrate close to one right angle of the rectangular shape of the orthographic projection of the first pixel electrode on the first base substrate, and the edge of the orthographic projection of the first pixel electrode on the first base substrate is less than or equal to 1.5 micrometers.

It should be noted that when the orthographic projection of the first via on the first base substrate is close to one right angle of the rectangular shape of the orthographic projection of the first pixel electrode on the first base substrate, as shown in FIG. 28, the pattern of the rectangular first pixel electrode 6 has a first symmetry axis 32 extending along the first direction X and a second symmetry axis 33 extending along the second direction Y, the first symmetry axis 32 and the second symmetry axis 33 divide the first pixel electrode 6 into four sub-regions, which are a sub-region a, a sub-region b, a sub-region c, and a sub-region d; the orthographic projection of the first via 7 on the first base substrate falls within an orthographic projection of only one of the four sub-regions on the first base substrate. It should be noted that in FIG. 28, as an example, the orthographic projection of the first via 7 on the first base substrate falls within an orthographic projection of only the sub-region d on the first base substrate. In a specific implementation, the distance between each edge of the orthographic projection of the first via on the first base substrate close to the edge of the first pixel electrode in the sub-region d, and the edge of the orthographic projection of the first pixel electrode on the first base substrate is less than or equal to 1.5 micrometers. In FIG. 28, h3 and h4 are both less than or equal to 1.5 micrometers.

In some embodiments, as shown in FIGS. 17 and 18, the pattern of the orthographic projection of the active layer 17 on the first base substrate includes: a first portion 34, a second portion 35 and a third portion 36 connected sequentially;

As shown in FIG. 17, the first portion 34 is electrically connected to the source electrode S, the third portion is electrically connected to the drain electrode D, and an orthographic projection of the scanning line 29 on the first base substrate overlaps with an orthographic projection of the second portion 35 on the first base substrate.

In some embodiments, as shown in FIGS. 17, 18, the first portion 34 and the third portion 36 each include a portion extending along the second direction Y, the second portion 35 extends along the first direction X;

Both ends of the second portion 35 in the first direction X are connected to the first portion 34 and the third portion 36, respectively, and the first portion 34 and the third portion 36 are located on opposite sides of the second portion 35 in the second direction Y, respectively;

An extending direction of the second portion 35 is parallel to an extending direction of the scanning line 29; the orthographic projection of the second portion 35 on the first base substrate falls within the orthographic projection of the scanning line 29 on the first base substrate.

In the array substrate provided by the embodiment of the present disclosure, the pattern of the orthographic projection of the active layer on the first base substrate includes: the first portion, the second portion and the third portion connected sequentially; and the first portion and the third portion are respectively located on opposite sides of the second portion, that is, the pattern of the active layer is a zigzag pattern bent at least two times. Therefore, the active layers are uniformly distributed in the sub-pixel units, so that a larger area of each active layer in the sub-pixel unit caused by the intensive distribution of the active layers can be avoided, and a high pixel density can be easily realized. Further, a length of a channel region of the active layer can be increased, so as to reduce the leakage current of the thin film transistor.

In some embodiments, as shown in FIG. 17, in the second direction Y, a width of the second portion 35 is less than a width of the scanning line 29.

Therefore, the width of the second portion and the width of the scanning line can be adjusted to adjust a width-to-length ratio of the channel region of the active layer, so that the width-to-length ratio of the channel region of the active layer meets the requirement of the required driving current of the thin film transistor.

When the pattern of the orthographic projection of the active layer on the first base substrate includes: the first portion, the second portion and the third portion connected sequentially, the pattern of the active layer may be provided in other modes.

Figure 29:
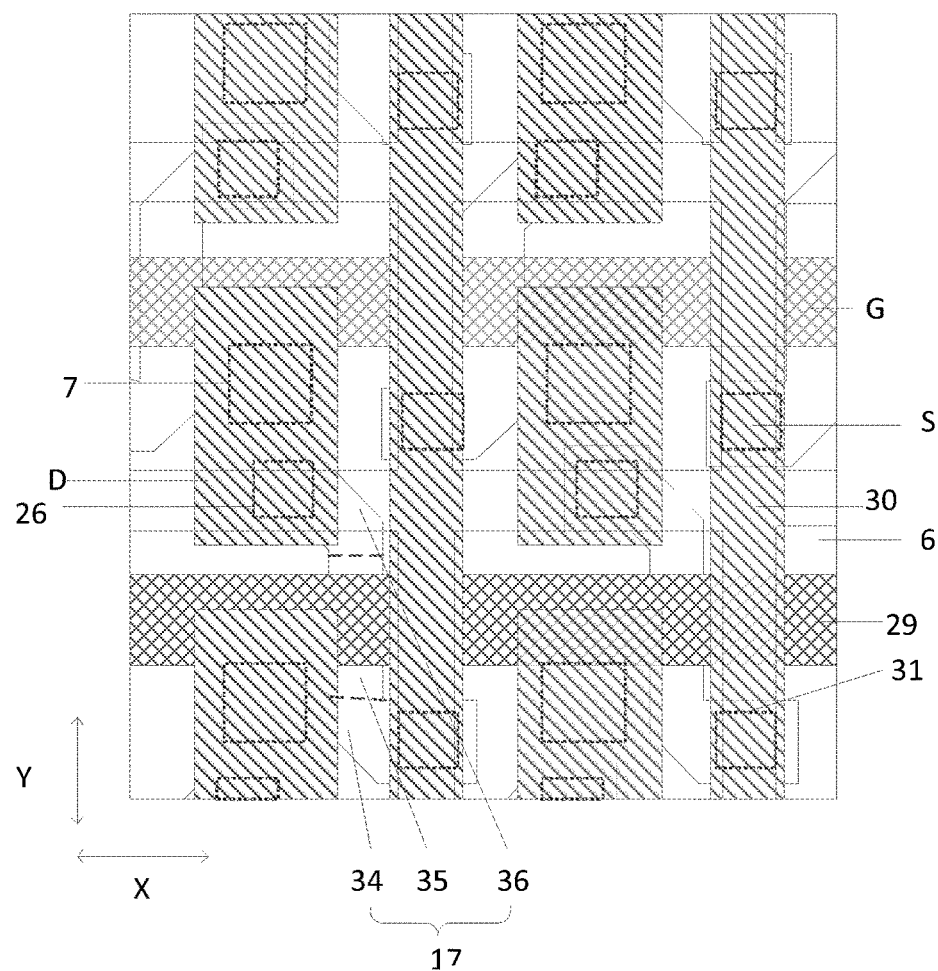
FIG. 29 is a schematic diagram of a structure of an array substrate according to an embodiment of the present disclosure.

In some embodiments, as shown in FIG. 29, the second portion 35 extends in the second direction Y;

Both ends of the second portion 35 in the second direction Y are connected to the first portion 34 and the third portion 36, respectively, and the first portion 34 and the third portion 36 are located on opposite sides of the second portion 35 in the first direction X;

The extending direction of the second portion 35 is perpendicular to the extending direction of the scanning line 29; the orthographic projection of the second portion 35 on the first base substrate overlaps with the orthographic projection of the scanning line 29 on the first base substrate, and an orthographic projection of the first portion 34 on the first base substrate and an orthographic projection of the third portion 36 on the first base substrate do not overlap with the orthographic projection of the scanning line 29 on the first base substrate.

In the array substrate provided by the embodiment of the present disclosure, the pattern of the orthographic projection of the active layer on the first base substrate includes: the first portion, the second portion and the third portion connected sequentially, and the first portion and the third portion are respectively located on opposite sides of the second portion, that is, the pattern of the active layer is a zigzag pattern bent at least three times. Therefore, the active layers are uniformly distributed in the sub-pixel units, so that a larger area of each active layer in the sub-pixel unit caused by the intensive distribution of the active layers can be avoided, and a high pixel density can be easily realized. The second portion extends along the second direction, so that the size of the active layer in the first direction can be reduced while the active layers are uniformly distributed, and the pixel density can be further improved. The second portion has a regular strip pattern, so that the part in which the active layer and the scanning line overlap with each other has a regular quadrilateral pattern. Compared with the condition that the part in which the active layer and the scanning line overlap with each other has an irregular pattern, the influence of the process deviation of forming the pattern of the active layer on a width and a length of the channel region of the thin film transistor can be reduced.

Figure 30:
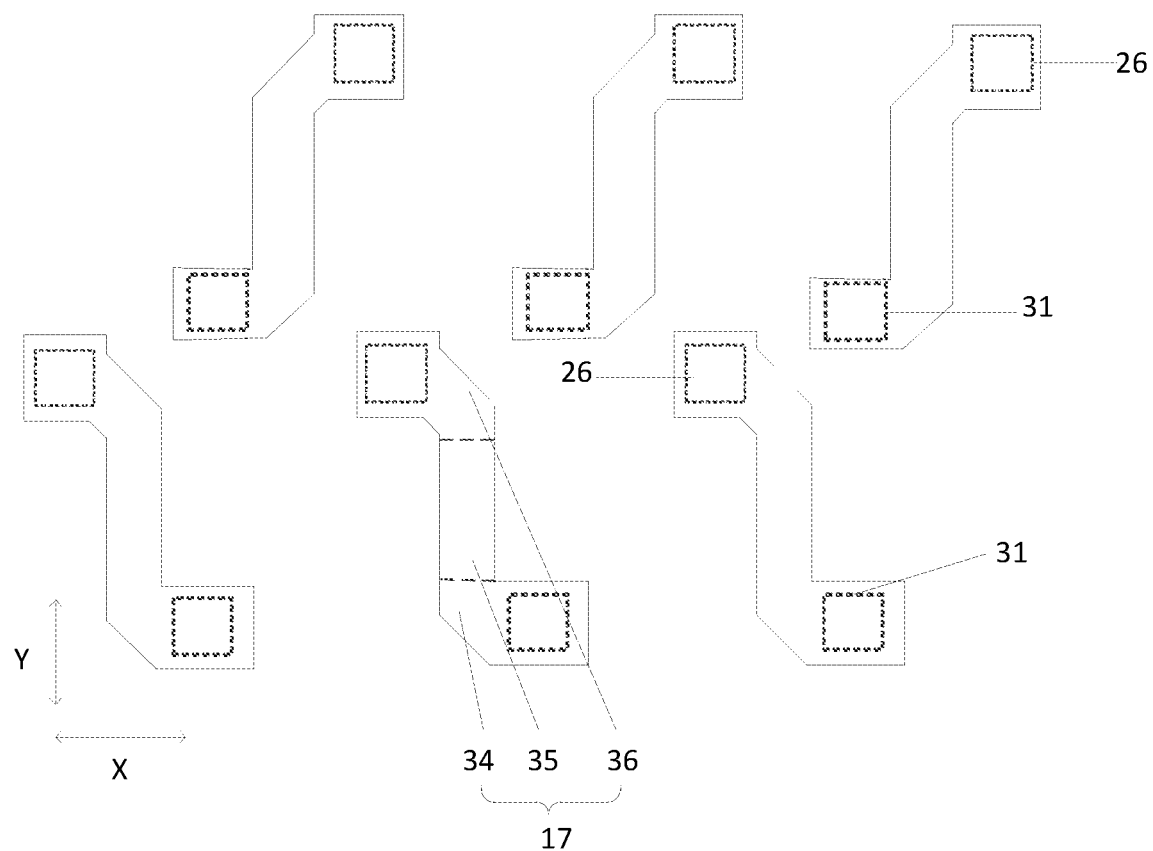
FIG. 30 is a schematic diagram of a structure of another active layer according to an embodiment of the present disclosure.

It should be noted that in the array substrate shown in FIG. 29, patterns of active layers included in two adjacent sub-pixel unit rows are completely different from each other. As shown in FIG. 30, in the two adjacent sub-pixel unit rows, for each active layer, the first portion 34 is located below the second portion 35, and the second portion 36 is located above the second portion 35; but in one of the two adjacent sub-pixel unit rows, the second via 26 is located on the left side of the second portion 35, and the third via 31 is located on the right side of the second portion 35; in the other row, the second via 26 is located on the right side of the second portion 35, and the third via 31 is located on the left side of the second portion 35.

It should be noted that as shown in FIGS. 29 to 30, the region of the second portion 35 overlapping with the scanning line 29 is the semiconductor region, and the region of the second portion 35 not overlapping with the scanning line 29 and the regions of the first portion 34 and the third portion 36 are conductorized regions.

When the pattern of the orthographic projection of the active layer on the first base substrate includes: the first portion, the second portion and the third portion connected sequentially, the pattern of the active layer may be provided in other modes.

Figure 31:
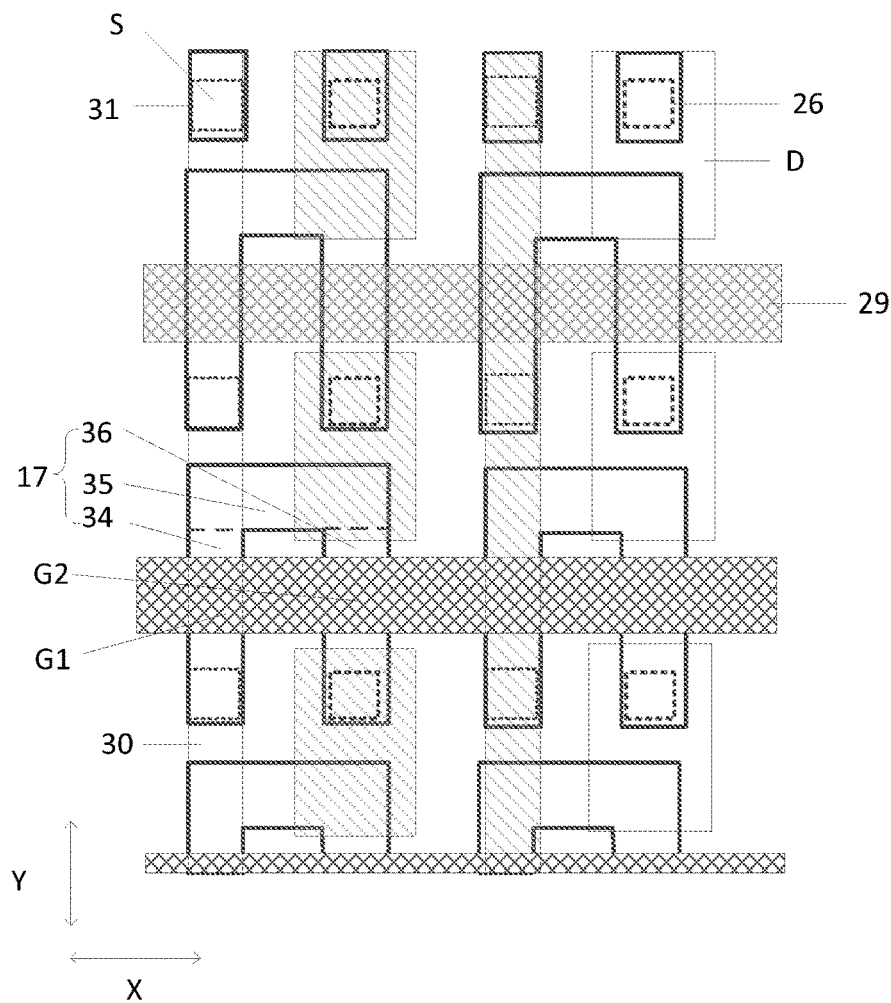
FIG. 31 is a schematic diagram of a structure of another array substrate according to an embodiment of the present disclosure.

In some embodiments, as shown in FIG. 31, the pattern of the orthographic projection of the active layer 17 on the first base substrate includes: the first portion 34, the second portion 35 and the third portion 36 connected sequentially; the first portion 34 and the third portion 36 extend in the second direction Y, the second portion 35 extends in the first direction X;

Both ends of the second portion 35 in the first direction X are connected to the first portion 34 and the third portion 36, and the first portion 34 and the third portion 36 are located on the same side of the second portion 35 in the second direction Y;

The first portion 34 is electrically connected to the source electrode S, and the third portion 36 is electrically connected to the drain electrode D;

The gate electrode includes a first gate electrode G1 and a second gate electrode G2;

The orthographic projection of the scanning line 29 on the first base substrate overlaps with an orthographic projection of each of the first portion 34 and the third portion 36 on the first base substrate, and does not overlap with an orthographic projection of the second portion 35 on the first base substrate;

The first gate electrode G1 is located in a region of the scanning line 29 where the orthographic projection of the scanning line 29 on the first base substrate overlaps with the orthographic projection of the first portion 34 on the first base substrate, and the second gate electrode G2 is located in a region of the scanning line 29 where the orthographic projection of the scanning line 29 on the first base substrate overlaps with the orthographic projection of the third portion 36 on the first base substrate.

That is, as shown in FIG. 31, the shape of the pattern of the orthographic projection of the active layer 17 on the first base substrate is U-shaped. It should be note that in order to clearly illustrate the relationship between orthographic projections of the active layer and layers of the transistor, the orthographic projection of the first pixel electrode on the first base substrate is not shown in FIG. 31.

According to the array substrate provided by the embodiment of the present disclosure, the shape of the pattern of the orthographic projection of the active layer on the first base substrate is U-shaped, so that the scanning line extending along the first direction can overlap with two regions of the active layer; the gate electrode includes the first gate electrode G1 and the second gate electrode G2, that is, the thin film transistor is a double-gate thin film transistor, so that the leakage current of the thin film transistor can be reduced.

It should be noted that as shown in FIG. 31, the regions of the first portion 34 and the third portion 36 overlapping with the scanning line 29 are the semiconductor regions, and the regions of the first portion 34 and the third portion 36 not overlapping with the scanning line 29 and the second portion 35 are the conductorized regions.

The active layer may have other patterns in addition to the patterns of the active layer shown in FIGS. 18 and 29 to 31.

Figure 32:
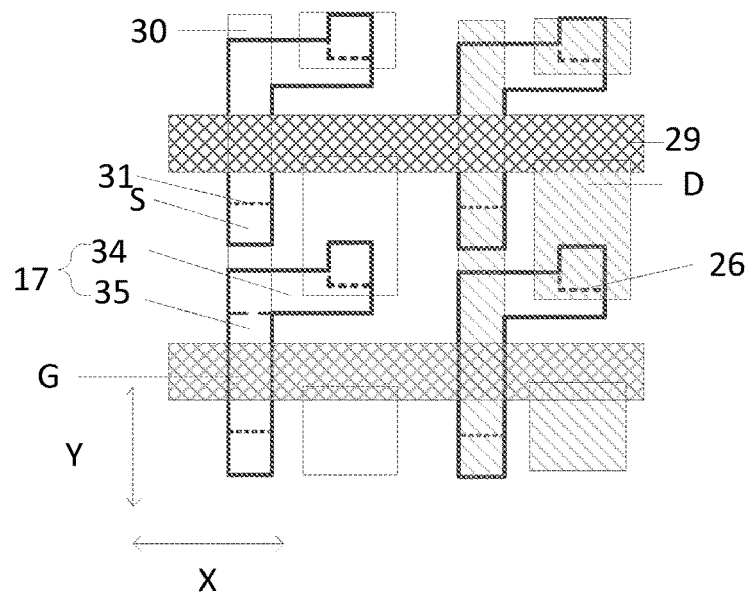
FIG. 32 is a schematic diagram of a structure of another array substrate according to an embodiment of the present disclosure.
Figure 33:
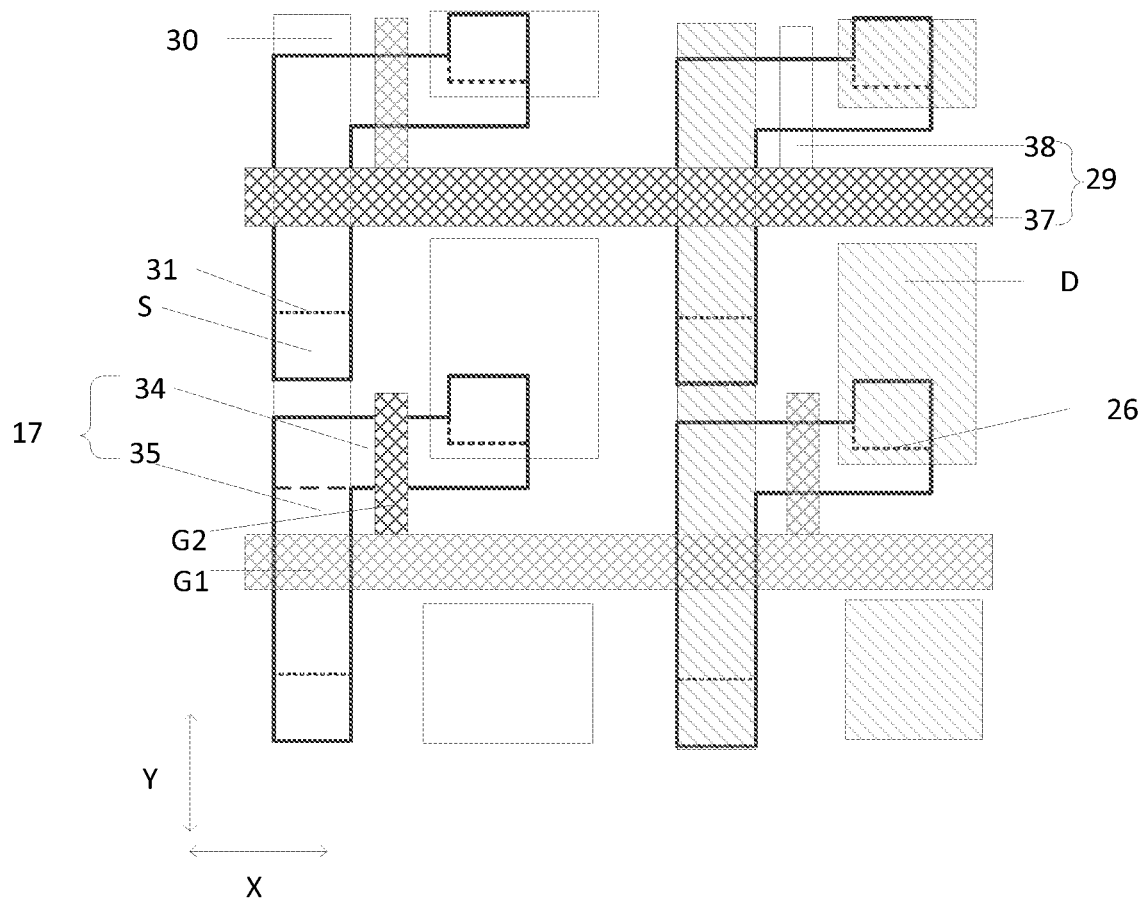
FIG. 33 is a schematic diagram of a structure of another array substrate according to an embodiment of the present disclosure.

In some embodiments, as shown in FIGS. 32 and 33, the pattern of the orthographic projection of the active layer 17 on the first base substrate includes: the first portion 34 and the second portion 35 connected to each other; the first portion 34 extends along the first direction X, the second portion 35 extends along the second direction Y;

The first portion 34 is electrically connected to the drain electrode D, and the second portion 35 is electrically connected to the source electrode S;

The orthographic projection of the scanning line 29 on the first base substrate overlaps with the orthographic projection of at least one of the first portion 34 and the second portion 35 on the first base substrate.

That is, in the array substrate provided by the embodiment of the present disclosure, the pattern of the orthographic projection of the active layer on the first base substrate is L-shaped.

In some embodiments, as shown in FIG. 32, the orthographic projection of the scanning line 29 on the first base substrate has a strip shape extending along the first direction X, and the orthographic projection of the scanning line 29 on the first base substrate overlaps with only the orthographic projection of the second portion 35 on the first base substrate.

It should be noted that as shown in FIG. 32, the region of the second portion 35 overlapping with the scanning line 29 is the semiconductor region, and the region of the second portion 35 not overlapping with the scanning line 29 and the first portion 34 are the conductorized regions.

In a specific implementation, the pattern of the first portion is the strip shape, and the scanning line overlaps with the strip-shaped second portion, so that the width-to-length ratio of the channel region of the active layer can be increased, and the driving current of the thin film transistor can be improved.

Alternatively, in some embodiments, as shown in FIG. 33, the orthographic projection of the scanning line 29 on the first base substrate overlaps with the orthographic projection of each of the first portion 34 and the second portion 35 on the first base substrate;

The first gate electrode G1 is located in a region of the scanning line 29 where the orthographic projection of the scanning line 29 on the first base substrate overlaps with the orthographic projection of the second portion 35 on the first base substrate, and the second gate electrode G2 is located in a region of the scanning line 29 where the orthographic projection of the scanning line 29 on the first base substrate overlaps with the orthographic projection of the first portion 34 on the first base substrate.

According to the array substrate provided by the embodiment of the present disclosure, the scanning line overlaps with two regions of the active layer, and the gate electrode includes the first gate electrode G1 and the second gate electrode G2, that is, the thin film transistor is a double-gate thin film transistor, so that the leakage current of the thin film transistor can be reduced.

In some embodiments, as shown in FIG. 33, a pattern of the orthographic projection of the scanning line 29 on the first base substrate includes a strip-shaped first pattern 37 extending in the first direction X, and a second pattern 38 connected to the first pattern 37 on a side of the first pattern 37 in the second direction Y;

An orthographic projection of the first pattern 37 on the first base substrate overlaps with the orthographic projection of the second portion 35 on the first base substrate, and the orthographic projection of the second pattern 38 on the first base substrate overlaps with the orthographic projection of the first portion 34 on the first base substrate.

It should be noted that as shown in FIG. 33, the regions of the first portion 34 and the second portion 35 overlapping with the scanning line 29 are semiconductor regions, and the regions of the first portion 34 and the second portion 35 not overlapping with the scanning line 29 are conductorized regions.

It should be noted that FIGS. 17 to 33 do not show the pattern of the common electrode. In a specific implementation, as shown in FIG. 1, the common electrode 4 is a planar electrode having a plurality of second openings 21, and the common electrode 4 keeps away from the pixel electrodes through the second openings 21. In a specific implementation, a common electrode layer may be deposited in the whole surface, and then the patterning process is performed on the whole surface of the common electrode layer to form the plurality of second openings. Alternatively, in a specific implementation, in order to adjust an electric field formed between the common electrode and the pixel electrodes, a strip-shaped third opening may be formed in an area outside the second openings, an orthographic projection of the third opening on the first base substrate overlaps with the orthographic projection of the first pixel electrode on the first base substrate; the strip-shaped third opening extends along the second direction, and the number of the third openings may be set according to an actual need.

Figure 34:
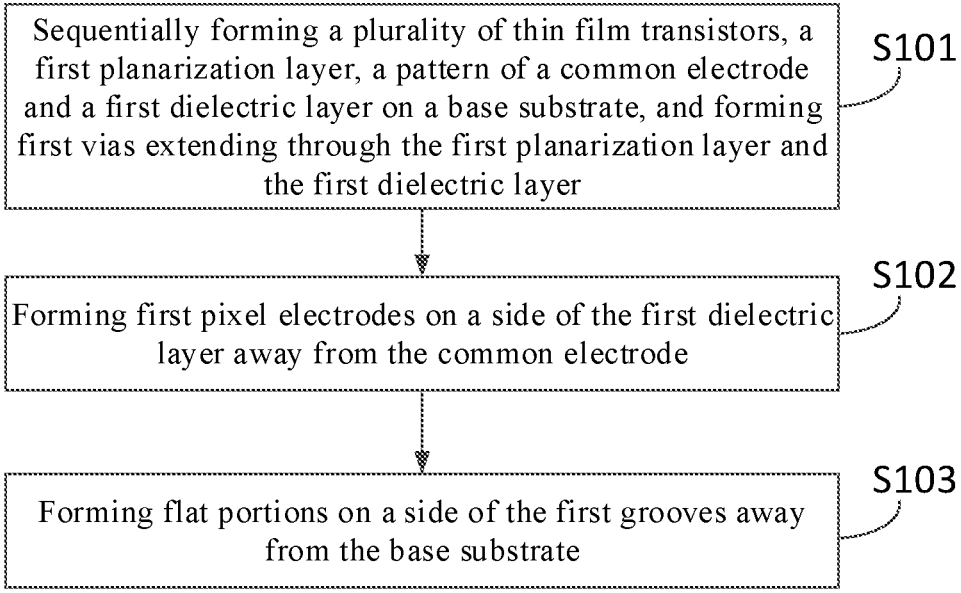
FIG. 34 is a schematic flow chart illustrating a method for manufacturing an array substrate according to an embodiment of the present disclosure.

Based on the same inventive concept, an embodiment of the present disclosure further provides a method for manufacturing an array substrate, as shown in FIG. 34, the method includes:

S101, sequentially forming a plurality of thin film transistors, a first planarization layer, a pattern of a common electrode and a first dielectric layer on a first base substrate, and forming first vias extending through the first planarization layer and the first dielectric layer;

S102, forming first pixel electrodes on a side of the first dielectric layer away from the common electrode; the first pixel electrodes are electrically connected to the plurality of thin film transistors in a one-to-one correspondence manner through the first vias extending through the first dielectric layer and the first planarization layer; a surface of each first pixel electrode away from the first base substrate is provided with a first groove at least corresponding to the first via;

S103, forming flat portions on a side of the first grooves away from the first base substrate; a distance from a surface of each flat portion away from the first base substrate to the first base substrate is substantially the same as a distance from the surface of each first pixel electrode away from the first base substrate to the first base substrate.

According to the method for manufacturing an array substrate of the embodiment of the present disclosure, after the first pixel electrodes are formed, the flat portions for filling and leveling the first grooves of the first pixel electrodes are formed, which can improve the uniformity of the thickness of the array substrate. When the manufactured array substrate is applied to the liquid crystal cell, the uniformity of the liquid crystal cell gap can be improved, the quality of regulating and controlling a light field of the liquid crystal cell can be improved, and the phenomena of uneven image quality and the insufficient modulating linearity can be avoided.

In some embodiments, after forming the flat portions on the side of the first grooves away from the first base substrate, the method further includes:

Forming second pixel electrodes on a side of the flat portions away from the first base substrate.

In some embodiments, forming the first pixel electrodes on a side of the first dielectric layer away from the common electrode specifically includes:

Depositing a first pixel electrode material on the side of the first dielectric layer away from the common electrode, so as to form a first pixel electrode layer;

Patterning the first pixel electrode layer to form patterns of the plurality of first pixel electrodes;

Forming the second pixel electrodes on the side of the flat portions away from the first base substrate specifically include:

Depositing a second pixel electrode material on the side of the flat portions away from the first base substrate, so as to form a second pixel electrode layer;

Patterning the second pixel electrode layer to form patterns of the plurality of second pixel electrodes.

In a specific implementation, the steps of patterning the first pixel electrode layer and the second pixel electrode layer include: coating photoresist, exposing, developing, etching and the like. The etching may be, for example, a dry etching process.

In some embodiments, forming the first pixel electrodes on the side of the first dielectric layer away from the common electrode specifically includes:

Depositing a first pixel electrode material on a side of the first dielectric layer away from the common electrode, so as to form a first pixel electrode layer;

Forming the second pixel electrodes on the side of the flat portions away from the first base substrate specifically include:

Depositing a second pixel electrode material on a side of the flat portions away from the first base substrate, so as to form a second pixel electrode layer;

Patterning the second pixel electrode layer and the first pixel electrode layer to form patterns of the plurality of second pixel electrodes and patterns of the plurality of first pixel electrodes.

According to the method for manufacturing an array substrate provided by the embodiment of the present disclosure, the patterning process is not required to be performed after the first pixel electrode layer is formed, and after the second pixel electrode layer is formed, the patterns of the second pixel electrodes and the patterns of the first pixel electrodes are formed through a single patterning process, wherein an orthographic projection of each second pixel electrode on the first base substrate substantially overlaps with an orthographic projection of the corresponding first pixel electrode on the first base substrate, so that one patterning process can be saved, and the cost can be saved.

In a specific implementation, the steps of patterning the second pixel electrode layer and the first pixel electrode layer include: coating photoresist, exposing, developing, etching and the like. The etching may be, for example, a dry etching process.

In some embodiments, after forming the second pixel electrodes on the side of the flat portions away from the first base substrate, the method further includes:

Forming a first protective layer on a side of the second pixel electrodes away from the flat portions;

Forming patterns of floating reflective patterns on a side of the first protective layer away from the second pixel electrodes.

In some embodiments, forming the flat portions on a side of the first grooves away from the first base substrate, specifically includes:

Forming a photosensitive resin layer on a side of the first grooves away from the first base substrate;

Forming patterns of the flat portions by adopting an exposure and development process;

Performing an ashing process on a surface of each flat portion.

It should be noted that the surface of each flat portion is subjected to the ashing process, so that the planarization effect of the surface of the flat portion away from the base substrate can be improved.

In some embodiments, each first via includes a first sub-via and a second sub-via; sequentially forming the first planarization layer, the common electrode, and the first dielectric layer on the first base substrate, and forming the first vias extending through the first planarization layer and the first dielectric layer, specifically includes:

Depositing a first planarization layer material on a side of the thin film transistors away from the first base substrate, and forming the first planarization layer;

Patterning the first planarization layer to form a plurality of first sub-vias, to obtain a pattern of the first planarization layer;

Forming a pattern of the common electrode on a side of the first planarization layer away from the first base substrate;

Depositing a first dielectric layer material on a side of the common electrode away from the first planarization layer, so as to form the first dielectric layer;

Patterning the first dielectric layer to form a plurality of second sub-vias extending through the first dielectric layer, to obtain the pattern of the first dielectric layer.

In a specific implementation, the first planarization layer is made of an organic material, and the first dielectric layer is made of an inorganic material. The organic material may be, for example, a photosensitive resin. The inorganic material may be silicon nitride (SiN), silicon oxide ($SiO_2$), or a $SiN/SiO_2$ stack. The patterning the first planarization layer, for example, may include pre-baking, exposing and developing the first planarization layer made of the photosensitive resin to form the first sub-vias, and then performing a thermal curing process on the first planarization layer including the first sub-vias. The patterning the first dielectric layer includes, for example: coating photoresist, exposing, developing, etching and the like. The etching may be, for example, a dry etching process.

In some embodiments, while the forming the pattern of the common electrode on the side of the first planarization layer away from the first base substrate, the method further includes:

Forming patterns of first connection electrodes covering the corresponding first sub-vias.

Specifically, a common electrode material may be deposited on the side of the first planarization layer away from the first base substrate to form the common electrode layer, and then the common electrode layer is patterned to form the pattern of the common electrode and the patterns of the first connection electrodes.

According to the method for manufacturing an array substrate provided by the embodiment of the present disclosure, patterns of the first connection electrodes are formed in the first vias while a pattern of the common electrode is formed, so that the subsequently formed first pixel electrodes are electrically connected to the corresponding thin film transistors through the first connection electrodes, and thus, the process of electrically connecting the first pixel electrodes and the corresponding thin film transistors is simple and easy to implement, it can avoid the lapping disconnection caused by a direct contact of the first pixel electrodes with the thin film transistors through the deep first vias, and the yield of the array substrate can be improved.

In some embodiments, each first via includes a first sub-via and a second sub-via; sequentially forming the first planarization layer, the common electrode, and the first dielectric layer on the first base substrate, and forming the first vias extending through the first planarization layer and the first dielectric layer, specifically includes:

Spin-coating a first planarization layer material on a side of the thin film transistors away from the first base substrate, and forming the first planarization layer by adopting a thermal curing process;

Forming the pattern of the common electrode on a side of the first planarization layer away from the first base substrate;

Depositing a first dielectric layer material on a side of the common electrode away from the first planarization layer, so as to form the first dielectric layer;

Patterning the first dielectric layer and the planarization layer to form the second sub-vias extending through the first dielectric layer and the first sub-vias extending through the first planarization layer, so as to obtain the pattern of the first dielectric layer.

According to the method for manufacturing an array substrate provided by the embodiment of the present disclosure, the second sub-vias and the first sub-vias are formed through a single patterning process, so that the process flow for manufacturing the array substrate can be saved.

In a specific implementation, the first planarization layer is made of an inorganic material, and the first dielectric layer is made of an inorganic material. The inorganic material of the first planarization layer may be, for example, $SiO_2$. The inorganic material of the first dielectric layer may be SiN, $SiO_2$, or a $SiN/SiO_2$ stack.

In a specific implementation, organic siloxane is spin-coated on the side of the thin film transistors away from the first base substrate, and a $SiO_2$ layer is formed as the first planarization layer through a thermal curing process. The patterning process for the first dielectric layer and the $SiO_2$ layer includes: coating photoresist, exposing, developing, etching and the like. The etching may be, for example, a dry etching process.

In a specific implementation, a thickness of the first dielectric layer is less than that of the $SiO_2$ layer, and is less than 100 nm.

In some embodiments, before forming the first planarization layer, the method specifically includes:

Forming a buffer layer on the first base substrate;

Forming a pattern of an active layer of each thin film transistor on a side of the buffer layer away from the first base substrate;

Forming a pattern of a gate insulating layer on a side of the active layer away from the buffer layer;

Forming patterns of scanning lines on a side of the gate insulating layer away from the active layer; a gate electrode of the thin film transistor is located in an area where an orthographic projection of the scanning lines on the first base substrate overlaps with an orthographic projection of the active layer on the first base substrate;

Performing a conductorized treatment on a region of the active layer which is not covered by the scanning lines to form a conductorized region; the conductorized region includes a first conductorized region and a second conductorized region;

Forming a first interlayer insulating layer on a side of the scanning lines away from the gate insulating layer, forming second vias extending through the first interlayer insulating layer and the gate insulating layer, and forming third vias extending through the first interlayer insulating layer and the gate insulating layer;

Forming patterns of data lines and patterns of drain electrodes on a side of the first interlayer insulating layer away from the scanning lines; each drain electrode is in contact with the first conductorized region of the active layer through the corresponding second via, each data line is in contact with the second conductorized region of the active layer through the corresponding third via, and a source electrode of the thin film transistor is located in an area of the scanning line in contact with the second conductorized region of the active layer.

Alternatively, in some embodiments, before forming the first planarization layer, the method specifically includes:

Forming a buffer layer on a first base substrate;

Forming a pattern of an active layer of each thin film transistor on a side of the buffer layer away from the first base substrate;

Forming a pattern of a gate insulating layer on a side of the active layer away from the buffer layer;

Forming patterns of scanning lines on a side of the gate insulating layer away from the active layer; a gate electrode of the thin film transistor is located in an area where an orthographic projection of the scanning lines on the first base substrate overlaps with an orthographic projection of the active layer on the first base substrate;

Performing a conductorized treatment on a region of the active layer which is not covered by the scanning lines to form a conductorized region; the conductorized region includes a first conductorized region and a second conductorized region;

Forming a first interlayer insulating layer on a side of the scanning lines away from the gate insulating layer, and forming third vias extending through the first interlayer insulating layer and the gate insulating layer;

Forming patterns of data lines on a side of the first interlayer insulating layer away from the scanning lines; each data line is in contact with the second conductorized region of the active layer through the corresponding third via, and a source electrode of the thin film transistor is located in an area of the scanning line in contact with the second conductorized region of the active layer.

Forming a second interlayer insulating layer on a side of the data lines away from the first interlayer insulating layer, and forming second vias extending through the second interlayer insulating layer, the first interlayer insulating layer and the gate insulating layer;

Forming patterns of drain electrodes on a side of the second interlayer insulating layer away from the data lines; each drain electrode is in contact with the first conductorized region of the active layer through the corresponding second via.

According to the method for manufacturing an array substrate provided by the embodiment of the present disclosure, the source electrode and the drain electrode are disposed in different conductive layers, so that even if a distance between an edge of an orthographic projection of the source electrode on the first base substrate and an edge of an orthographic projection of the drain electrode on the first base substrate is reduced, a short circuit between the source electrode and the drain electrode is not caused. In this way, the difficulty for designing a layout of the array substrate can be reduced. The distance between the edge of the orthographic projection of the source electrode on the first base substrate and the edge of the orthographic projection of the drain electrode on the first base substrate can be reduced, so that a size of the sub-pixel unit can be reduced, a high pixel density can be realized, the resolution can be improved, and a high-resolution display can be realized.

Figure 35:
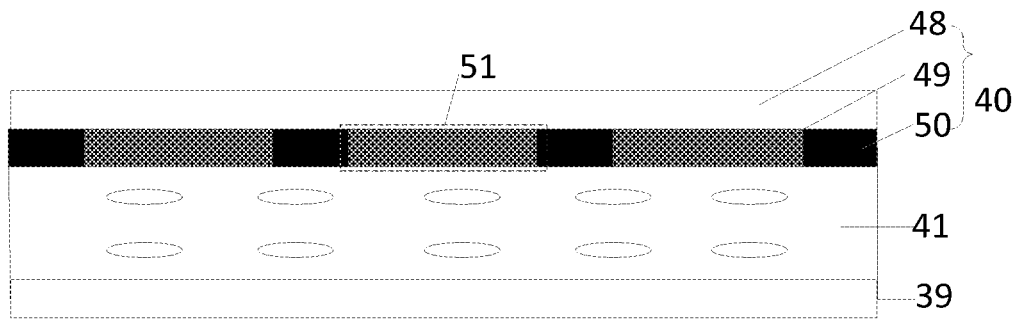
FIG. 35 is a schematic diagram of a structure of a liquid crystal cell according to an embodiment of the present disclosure.
Figure 36:
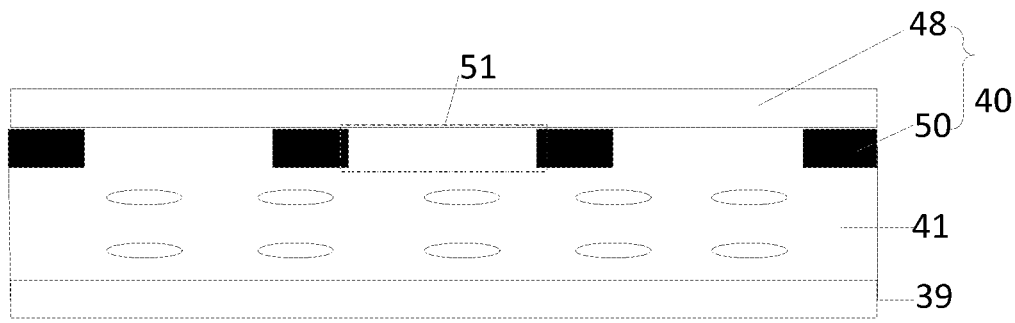
FIG. 36 is a schematic diagram of a structure of another liquid crystal cell according to an embodiment of the present disclosure.

As shown in FIGS. 35 and 36, an embodiment of the present disclosure provides a liquid crystal cell, including:

The array substrate 39 provided by the embodiment of the present disclosure;

An opposite substrate 40 disposed opposite to the array substrate 39;

A liquid crystal layer 41 located between the array substrate 39 and the opposite substrate 40.

In some embodiments, the liquid crystal cell provided by the embodiments of the present disclosure may be used as a display panel of a liquid crystal display. As shown in FIG. 35, the opposite substrate 40 includes a second base substrate 48, and color filters 49 and a black matrix 50 located on a side of the second base substrate 48 close to the liquid crystal layer 41. The black matrix 50 includes opening regions 51 in one-to-one correspondence with the sub-pixel units, and each color filter 49 is located in the corresponding opening region 51.

In some embodiments, the plurality of sub-pixel units includes a plurality of red sub-pixel units, a plurality of blue sub-pixel units, and a plurality of green sub-pixel units; correspondingly, the color filters include red color filters corresponding to the red sub-pixel units, blue color filters corresponding to the blue sub-pixel units, and green color filters corresponding to the green sub-pixel units.

Alternatively, in some embodiments, the liquid crystal cell serves as a light control panel, that is, the phase distribution of the whole liquid crystal layer is periodic and similar to a topography of a grating structure by properly adjusting the electric field. As shown in FIG. 36, the opposite substrate 40 includes the second base substrate 48, and the black matrix 50 located on the second base substrate 48 close to the liquid crystal layer 41. The black matrix 50 includes the opening regions 51 in one-to-one correspondence with the sub-pixel units. When the liquid crystal cell is used as the light control panel, the color filters are unnecessarily provided in the opening regions.

Figure 37:
FIG. 37 is a schematic diagram of a structure of a display apparatus according to an embodiment of the present disclosure.
Figure 38:
FIG. 38 is a schematic diagram of a structure of another display apparatus according to an embodiment of the present disclosure.

An embodiment of the present disclosure provides a display apparatus, as shown in FIGS. 37 and 38, including the liquid crystal cell 42 according to an embodiment of the present disclosure.

In some embodiments, as shown in FIG. 37, the liquid crystal cell 42 provided in the embodiments of the present disclosure is a first liquid crystal cell 46, and the display apparatus further includes: a second liquid crystal cell 47 located on a light outgoing side of the first liquid crystal cell 46.

That is, the display apparatus provided by the embodiment of the present disclosure includes two liquid crystal cells, that is, the display apparatus includes a two-layer liquid crystal panel. The first liquid crystal cell is used as a light control panel, and each sub-pixel unit of the light control panel may independently control brightness and darkness, so that a picture displayed by the display apparatus is finer and smoother, and the display effect is improved. In a specific implementation, the color filters are unnecessarily provided in the first opposite substrate of the first liquid crystal cell. The second liquid crystal cell is used as a display panel and also includes an array substrate, a liquid crystal layer and an opposite substrate, and the color filters are necessarily provided in the second opposite substrate of the second liquid crystal cell. In a specific implementation, the second liquid crystal cell is a transmissive liquid crystal cell regardless of whether the display apparatus is a transmissive display or a reflective display. The array substrate of the second liquid crystal cell may also adopt the array substrate of the transmissive display provided by the embodiment of the present disclosure, that is, the common electrode and the first pixel electrodes both include transparent materials, and the flat portions fill and level the grooves of the first pixel electrodes. Alternatively, the array substrate of the second liquid crystal cell may include second pixel electrodes including a transparent material.

In some embodiments, when the display apparatus is a transmissive liquid crystal display, the display apparatus further includes a backlight module located on a side of the first liquid crystal cell away from the second liquid crystal cell.

In some embodiments, the display apparatus may be applied to 3D display; and as shown in FIG. 38, the display apparatus further includes:

A cylindrical lens structure 43 located on a light outgoing side of the liquid crystal cell 42;

A light-transmitting spacer layer 44 located between the liquid crystal cell 42 and the cylindrical lens structure 43;

A flat layer 45 located on a side of the cylindrical lens structure 45 away from the light-transmitting spacer layer 44.

In some embodiments, when the display apparatus is a transmissive liquid crystal display, the display apparatus further includes a backlight module located on a light incident side of the liquid crystal cell.

The display apparatus provided by the embodiment of the present disclosure is any product or component with a display function, such as a mobile phone, a tablet computer, a television, a display, a notebook computer, a digital photo frame, a navigator or the like. Other essential components of the display apparatus are understood by one of ordinary skill in the art to exist, and are not described herein and should not be used to limit the present disclosure. The implementation of the display apparatus may refer to the embodiments of the array substrate and the liquid crystal cell, and repeated descriptions are omitted.

To sum up, according to the array substrate, the method for manufacturing an array substrate, the liquid crystal cell and the display apparatus provided by the embodiment of the present disclosure, the flat portions are used to fill and level the first grooves of the first pixel electrodes in the regions where the first vias are located, which can improve the uniformity of the thickness of the array substrate. Further, the uniformity of the liquid crystal cell gap can be improved, the quality of regulating and controlling a light field of the liquid crystal cell can be improved, and the phenomena of uneven image quality and the insufficient modulating linearity can be avoided.

While preferred embodiments of the present disclosure have been described, additional changes and modifications in those embodiments may occur to one of ordinary skill in the art once they learn of the basic inventive concepts. Therefore, it is intended that the appended claims are interpreted as including the preferred embodiment and all changes and modifications that fall within the scope of the disclosure.

It will be apparent to one of ordinary skill in the art that various modifications and variations can be made in the embodiments of the present disclosure without departing from the spirit or scope of the embodiments of the present disclosure. Thus, if such modifications and variations of the embodiments of the present disclosure fall within the scope of the claims of the present disclosure and their equivalents, the present disclosure is also intended to encompass these modifications and variations.

What is claimed is:

1. An array substrate, comprising:
a first base substrate;
a plurality of thin film transistors on one side of the first base substrate;
a first planarization layer on a side of the plurality of thin film transistors away from the first base substrate;
a common electrode on a side of the first planarization layer away from the plurality of thin film transistors;
a first dielectric layer on a side of the common electrode away from the first planarization layer;
a plurality of first pixel electrodes on a side of the first dielectric layer away from the common electrode; wherein the plurality of first pixel electrodes are electrically connected to the plurality of thin film transistors in a one-to-one correspondence through first vias extending through the first dielectric layer and the first planarization layer; a surface of each first pixel electrode away from the first base substrate is provided with a first groove at least corresponding to a first via; and
a plurality of flat portions on a side of the first groove away from the first base substrate; wherein a distance from a surface of each flat portion away from the first base substrate to the first base substrate is substantially the same as a distance from the surface of each first pixel electrode away from the first base substrate to the first base substrate;
wherein the array substrate further comprises: a plurality of second pixel electrodes on a side of the plurality of first pixel electrodes away from the first base substrate, and in contact with the plurality of first pixel electrodes, respectively; and
wherein the common electrode is made of a transparent material; and
the plurality of first pixel electrodes are made of a transparent material and the plurality of second pixel electrodes are made of a reflective material; or the plurality of first pixel electrodes are made of a reflective material and the plurality of second pixel electrodes are made of a reflective material, and
wherein the array substrate further comprises:
a first protective layer on a side of the plurality of second pixel electrodes away from the first base substrate; and
a plurality of floating reflective patterns on a side of the first protective layer away from the plurality of second pixel electrodes; wherein an orthographic projection of each floating reflective pattern on the first base substrate covers a gap between orthographic projections of two second pixel electrodes adjacent to the floating reflective pattern on the first base substrate.

2. The array substrate of claim 1, wherein an orthographic projection of each second pixel electrode on the first base substrate covers an orthographic projection of the corresponding first pixel electrode on the first base substrate.

3. The array substrate of claim 1, wherein each second pixel electrode comprises a first opening, and an orthographic projection of the first opening on the first base substrate covers an orthographic projection of the corresponding flat portion on the first base substrate.

4. The array substrate of claim 3, wherein the orthographic projection of each second pixel electrode on the first base substrate surrounds the orthographic projection of the corresponding flat portion on the first base substrate, and the orthographic projection of each second pixel electrode on the first base substrate and the orthographic projection of the corresponding flat portion on the first base substrate are combined together to form a closed pattern.

5. The array substrate of claim 1, wherein each first via comprises: a first sub-via extending through the first planarization layer and a second sub-via extending through the first dielectric layer; and
the first dielectric layer covers a part of the first sub-via, an orthographic projection of the second sub-via on the first base substrate is within an orthographic projection of the first sub-via on the first base substrate, and the second sub-via is within the first sub-via.

6. The array substrate of claim 1, wherein each first via comprises: a first sub-via extending through the first planarization layer and a second sub-via extending through the first dielectric layer; and
an orthographic projection of the first sub-via on the first base substrate is within an orthographic projection of the second sub-via on the first base substrate.

7. The array substrate of claim 6, wherein in a direction from each first pixel electrode to the first base substrate, a cross-sectional area of the first sub-via in a direction parallel to a plane where the first base substrate is located gradually decreases, a cross-sectional area of the second sub-via in the direction parallel to the plane where the first base substrate is located gradually decreases, and a maximum cross-sectional area of the first sub-via in the direction parallel to the plane where the first base substrate is located is equal to a minimum cross-sectional area of the second sub-via in the direction parallel to the plane where the first base substrate is located.

8. The array substrate of claim 6, wherein in a direction from each first pixel electrode to the first base substrate, a cross-sectional area of the first sub-via in a direction parallel to a plane where the first base substrate is located gradually decreases, a cross-sectional area of the second sub-via in the direction parallel to the plane where the first base substrate is located gradually decreases, and a maximum cross-sectional area of the second sub-via in the direction parallel to the plane where the first base substrate is located is greater than a minimum cross-sectional area of the first sub-via in the direction parallel to the plane where the first base substrate is located; and wherein the array substrate further comprises:
a plurality of first connection electrodes in a same layer as the common electrode and each covering the corresponding first sub-via; wherein each first connection electrode is in contact with the corresponding first pixel electrode and the corresponding thin film transistor.

9. A display apparatus, comprising a liquid crystal cell, wherein
the liquid crystal cell comprises:
the array substrate of claim 1;
an opposite substrate opposite to the array substrate; and
a liquid crystal layer between the array substrate and the opposite substrate.

10. An array substrate, comprising:
a first base substrate;
a plurality of thin film transistors on one side of the first base substrate;
a first planarization layer on a side of the plurality of thin film transistors away from the first base substrate;
a common electrode on a side of the first planarization layer away from the plurality of thin film transistors;
a first dielectric layer on a side of the common electrode away from the first planarization layer;
a plurality of first pixel electrodes on a side of the first dielectric layer away from the common electrode; wherein the plurality of first pixel electrodes are electrically connected to the plurality of thin film transistors in a one-to-one correspondence through first vias extending through the first dielectric layer and the first planarization layer; a surface of each first pixel electrode away from the first base substrate is provided with a first groove at least corresponding to a first via; and
a plurality of flat portions on a side of the first groove away from the first base substrate; wherein a distance from a surface of each flat portion away from the first base substrate to the first base substrate is substantially the same as a distance from the surface of each first pixel electrode away from the first base substrate to the first base substrate, wherein each thin film transistor comprises: an active layer, a gate electrode, a source electrode and a drain electrode; the drain electrode is electrically connected to the corresponding first pixel electrode; and the source electrode is located between the drain electrode and the first base substrate;
the array substrate comprises a plurality of scanning lines and a plurality of data lines crossing each other in horizontal and vertical directions to divide into a plurality of sub-pixel units; each sub-pixel unit comprises the thin film transistor and the first pixel electrode electrically connected to the thin film transistor; the plurality of scanning lines extend along a first direction and are arranged along a second direction, and the plurality of data lines extend along the second direction and are arranged along the first direction; the first direction intersects the second direction; the plurality of sub-pixel units are divided into: a plurality of sub-pixel unit rows extending along the first direction and arranged along the second direction, and a plurality of sub-pixel unit columns extending along the second direction and arranged along the first direction, wherein each sub-pixel unit row comprises a scanning line electrically connected to the thin film transistors in the sub-pixel unit row, and each sub-pixel unit column comprises a data line electrically connected to the thin film transistors in the sub-pixel unit column;
each scanning line is between the corresponding drain electrode and the active layer in a direction perpendicular to the first base substrate; a part of the scanning line, an orthographic projection of which on the first base substrate overlaps with the orthographic projection of the active layer on the first base substrate, is the gate electrode; and
the plurality of data lines are on a side of the plurality of scanning lines away from the active layer, and the source electrode is in an area of the data line where the data line is electrically connected to the active layer.

11. The array substrate of claim 10, wherein an orthographic projection of each first pixel electrode on the first base substrate overlaps with an orthographic projection of the scanning line, in a sub-pixel unit row adjacent to the sub-pixel unit row where the first pixel electrode is located, on the first base substrate; and/or
the orthographic projection of each first pixel electrode on the first base substrate overlaps with an orthographic projection of the data line in a same sub-pixel unit column as the first pixel electrode on the first base substrate.

12. The array substrate of claim 10, wherein a pattern of the orthographic projection of the active layer on the first base substrate comprises: a first portion, a second portion and a third portion connected sequentially; and
the first portion is electrically connected to the source electrode, the third portion is electrically connected to the drain electrode, and an orthographic projection of the scanning line on the first base substrate overlaps with an orthographic projection of the second portion on the first base substrate.

13. The array substrate of claim 12, wherein the first portion and the third portion each comprise a portion extending along the second direction, the second portion extends along the first direction;
both ends of the second portion in the first direction are connected to the first portion and the third portion, respectively, and the first portion and the third portion are on two opposite sides of the second portion in the second direction, respectively; and
an extending direction of the second portion is parallel to an extending direction of the scanning line; the orthographic projection of the second portion on the first base substrate falls within the orthographic projection of the scanning line on the first base substrate.

14. The array substrate of claim 13, wherein the second portion extends along the second direction;
both ends of the second portion in the second direction are connected to the first portion and the third portion, respectively, and the first portion and the third portion are on two opposite sides of the second portion in the first direction, respectively; and
the extending direction of the second portion is perpendicular to the extending direction of the scanning line; the orthographic projection of the second portion on the first base substrate overlaps with the orthographic projection of the scanning line on the first base substrate, and an orthographic projection of the first portion on the first base substrate and an orthographic projection of the third portion on the first base substrate do not overlap with the orthographic projection of the scanning line on the first base substrate.

15. The array substrate of claim 10, wherein a pattern of the orthographic projection of the active layer on the first base substrate comprises: a first portion, a second portion and a third portion connected sequentially; the first portion and the third portion extend in the second direction, the second portion extends in the first direction;

both ends of the second portion in the first direction are connected to the first portion and the third portion, respectively, and the first portion and the third portion are located on a same side of the second portion in the second direction;

the first portion is electrically connected to the source electrode, and the third portion is electrically connected to the drain electrode;

the orthographic projection of the scanning line on the first base substrate overlaps with an orthographic projection of each of the first portion and the third portion on the first base substrate, and does not overlap with an orthographic projection of the second portion on the first base substrate; and the gate electrode comprises a first gate electrode and a second gate electrode; the first gate electrode is in a region of the scanning line where the orthographic projection of the scanning line on the first base substrate overlaps with the orthographic projection of the first portion on the first base substrate, and the second gate electrode is located in a region of the scanning line where the orthographic projection of the scanning line on the first base substrate overlaps with the orthographic projection of the third portion on the first base substrate.

16. The array substrate of claim 10, wherein a pattern of the orthographic projection of the active layer on the first base substrate comprises: a first portion and a second portion connected to each other; the first portion extends along the first direction, the second portion extends along the second direction;

the first portion is electrically connected to the drain electrode, and the second portion is electrically connected to the source electrode; and the orthographic projection of the scanning line on the first base substrate overlaps with the orthographic projection of at least one of the first portion and the second portion on the first base substrate.

17. The array substrate of claim 16, wherein the orthographic projection of the scanning line on the first base substrate has a strip shape extending along the first direction, and the orthographic projection of the scanning line on the first base substrate overlaps with only the orthographic projection of the second portion on the first base substrate.

18. The array substrate of claim 16, wherein the orthographic projection of the scanning line on the first base substrate overlaps with the orthographic projection of each of the first portion and the second portion on the first base substrate; and the gate electrode comprises a first gate electrode and a second gate electrode; the first gate electrode is in a region of the scanning line where the orthographic projection of the scanning line on the first base substrate overlaps with the orthographic projection of the second portion on the first base substrate, and the second gate electrode is in a region of the scanning line where the orthographic projection of the scanning line on the first base substrate overlaps with the orthographic projection of the first portion on the first base substrate;

wherein a pattern of the orthographic projection of the scanning line on the first base substrate comprises a strip-shaped first pattern extending in the first direction, and a second pattern connected to the first pattern on a side of the first pattern in the second direction; and an orthographic projection of the first pattern on the first base substrate overlaps with the orthographic projection of the second portion on the first base substrate, and the orthographic projection of the second pattern on the first base substrate overlaps with the orthographic projection of the first portion on the first base substrate.

* * * * *